INVENTORS
LESLEY R. TUFTS
WALTER HOLMS
BY
J. A. Hobson Jr.
ATTORNEY

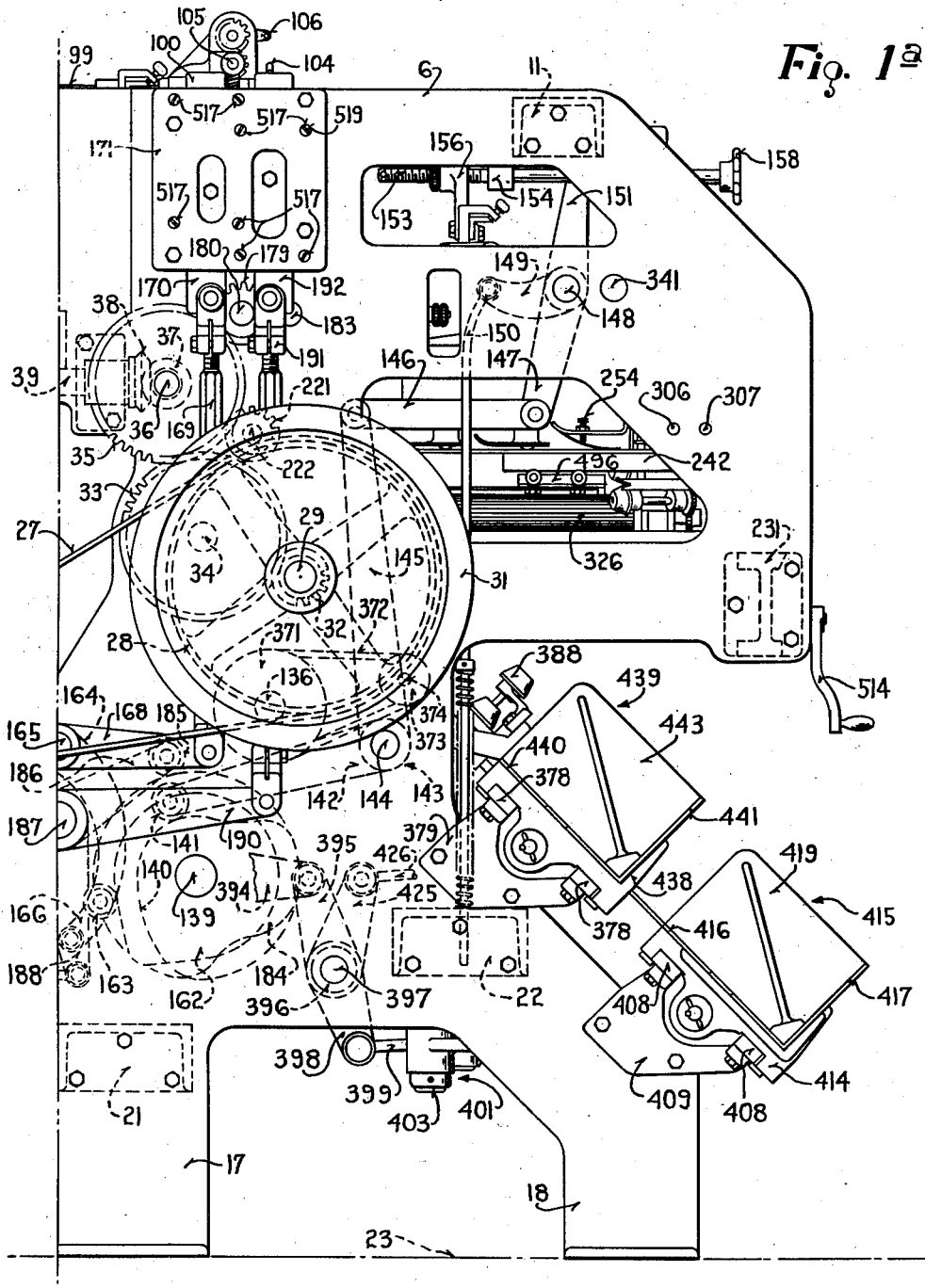
Fig. 1ᵃ

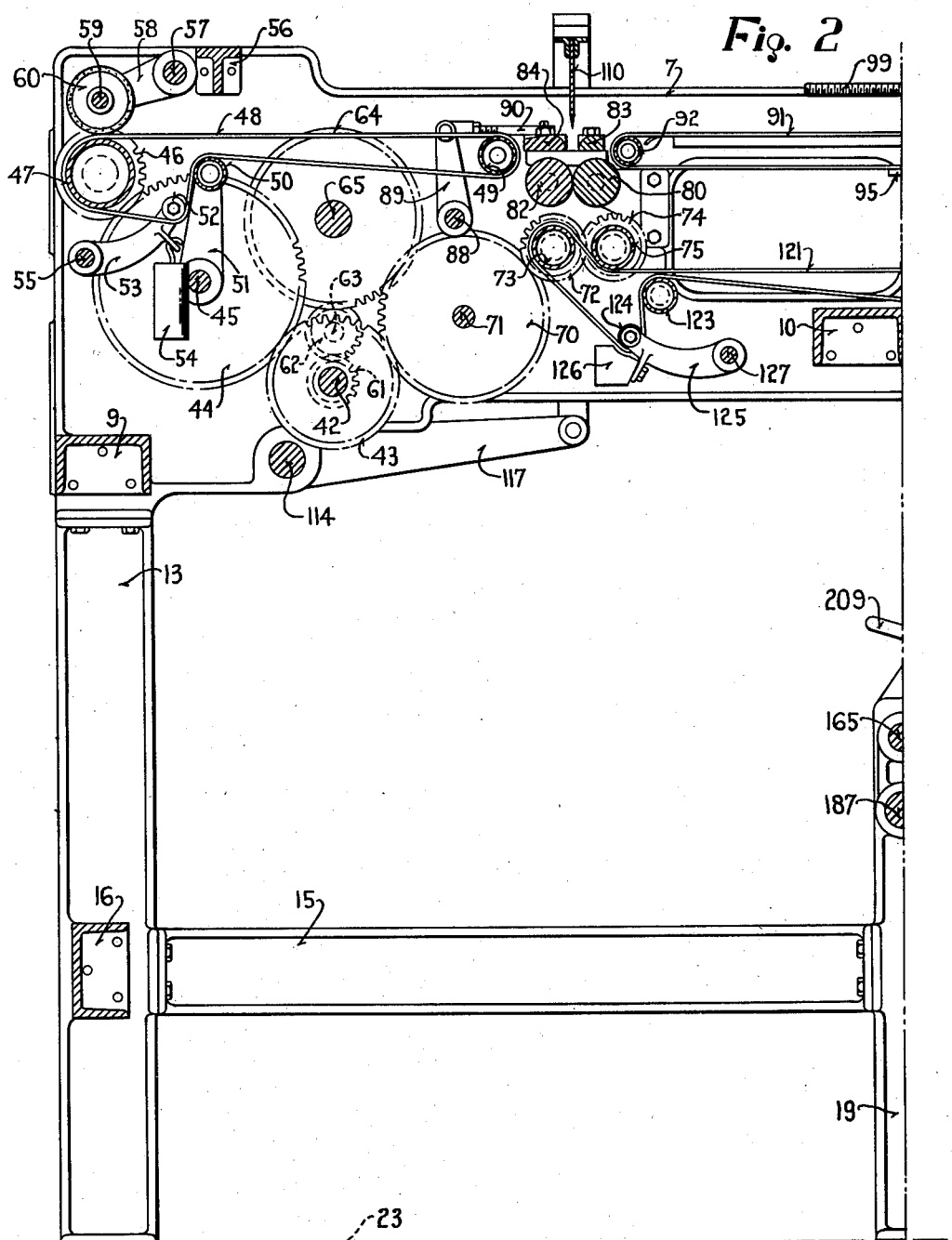

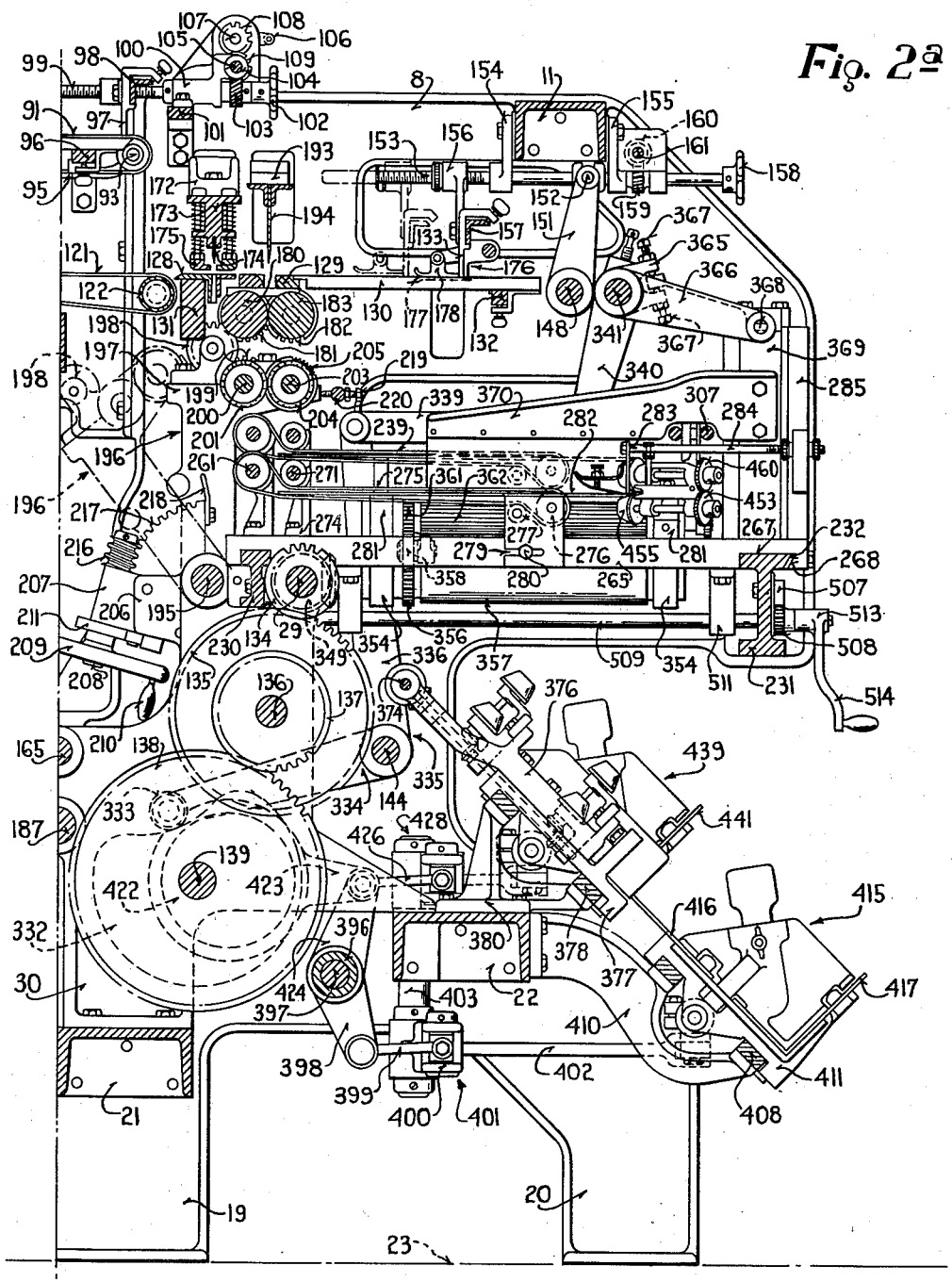
Fig. 2ᵃ

Feb. 18, 1941.  L. R. TUFTS ET AL  2,232,152
FOLDING MACHINE
Filed June 2, 1939  13 Sheets-Sheet 5
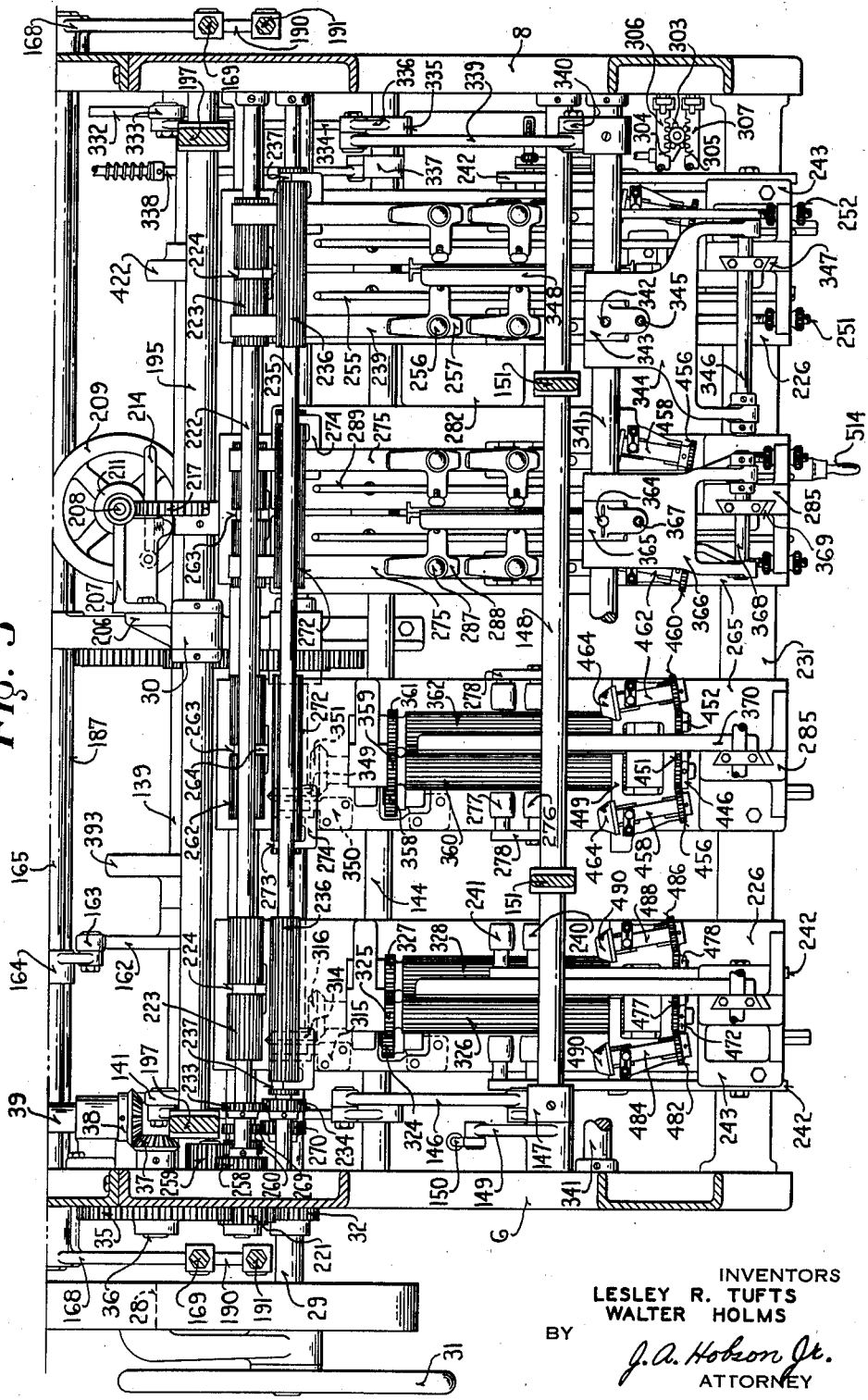
INVENTORS
LESLEY R. TUFTS
WALTER HOLMS
BY
J. A. Hobson Jr.
ATTORNEY Feb. 18, 1941.                L. R. TUFTS ET AL                2,232,152
                                 FOLDING MACHINE
                              Filed June 2, 1939          13 Sheets-Sheet 6
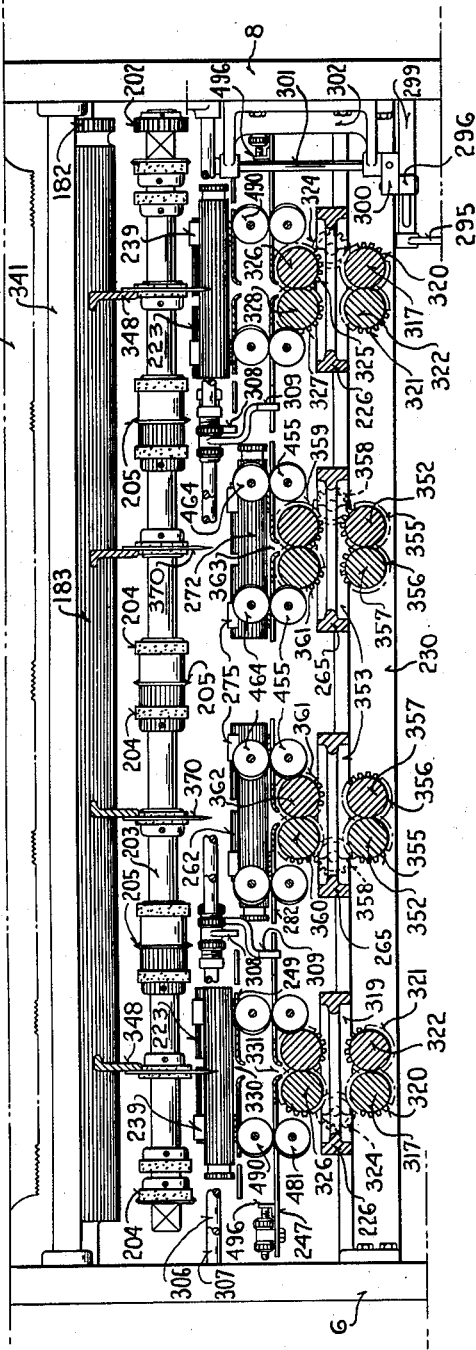
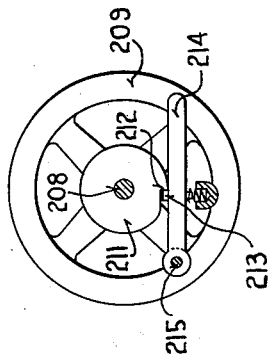
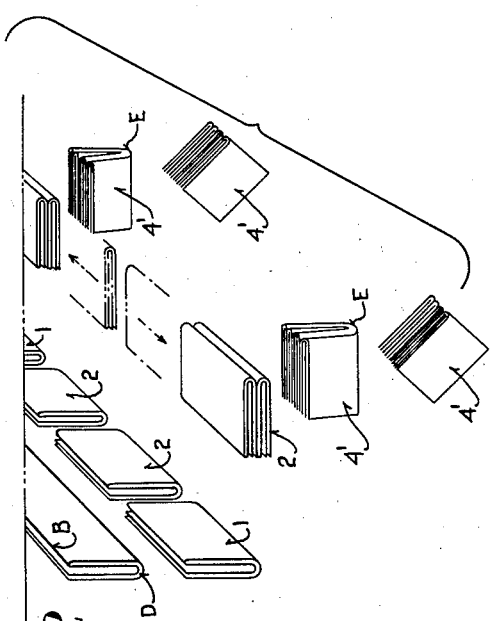
INVENTORS
LESLEY R. TUFTS
WALTER HOLMS
BY
J. A. Hobson Jr.
ATTORNEY Feb. 18, 1941. L. R. TUFTS ET AL 2,232,152
FOLDING MACHINE
Filed June 2, 1939 13 Sheets-Sheet 8

INVENTORS
LESLEY R. TUFTS
WALTER HOLMS
BY
*J. A. Hobson Jr.*
ATTORNEY

Feb. 18, 1941. L. R. TUFTS ET AL 2,232,152
FOLDING MACHINE
Filed June 2, 1939 13 Sheets-Sheet 9

INVENTORS
LESLEY R. TUFTS
WALTER HOLMS
BY
J. A. Hobson Jr.
ATTORNEY

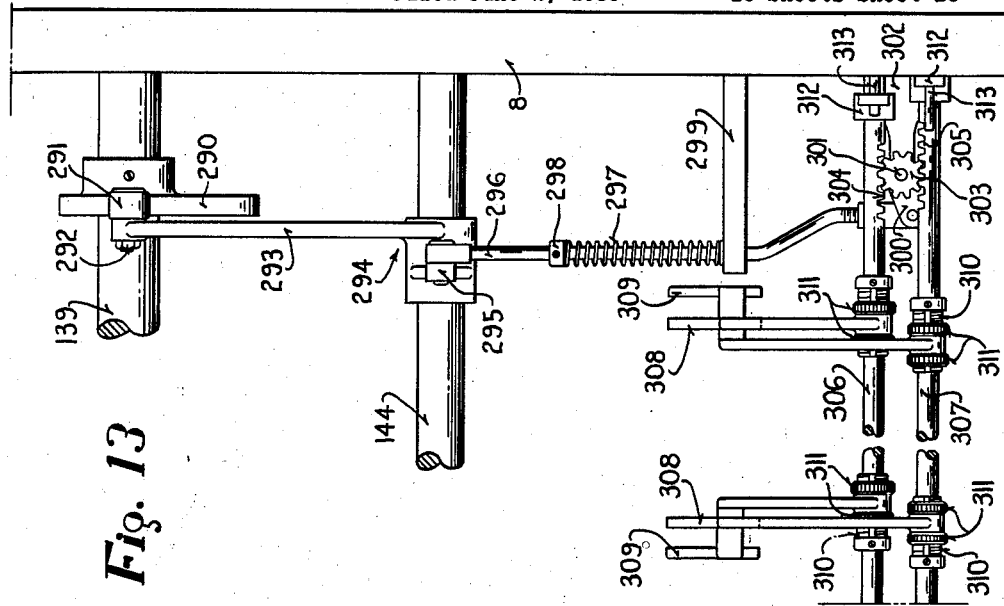
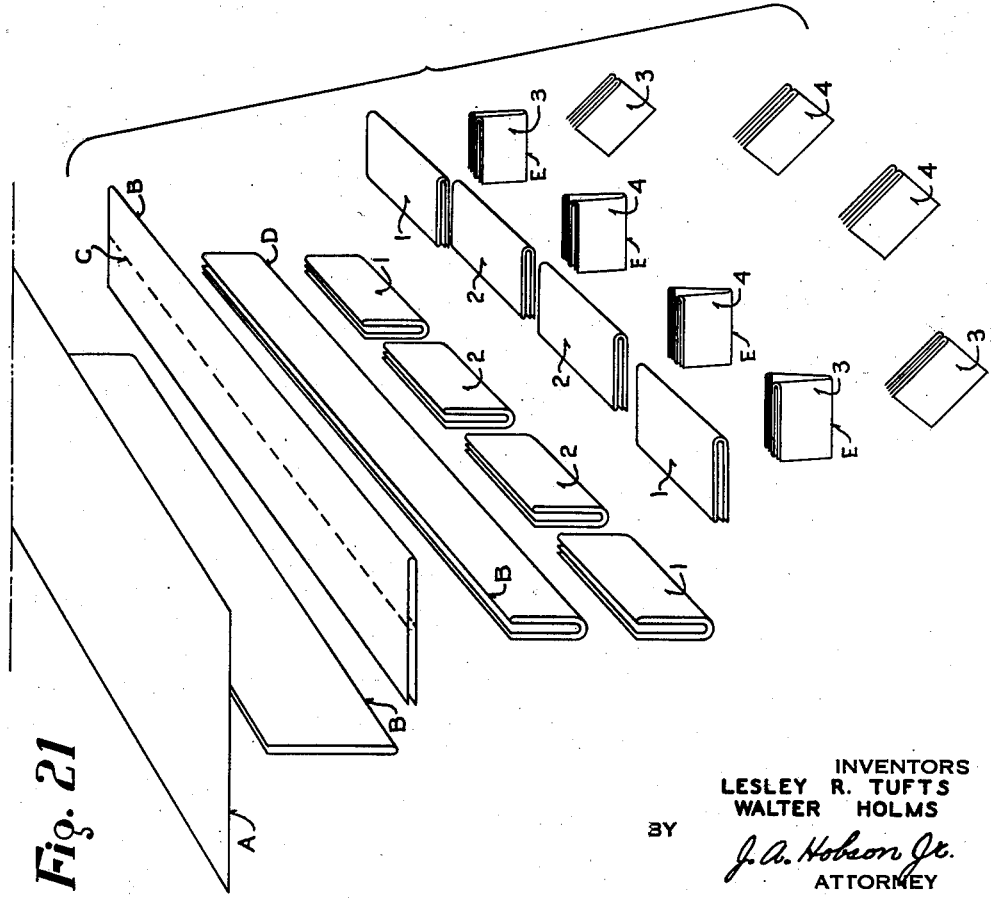

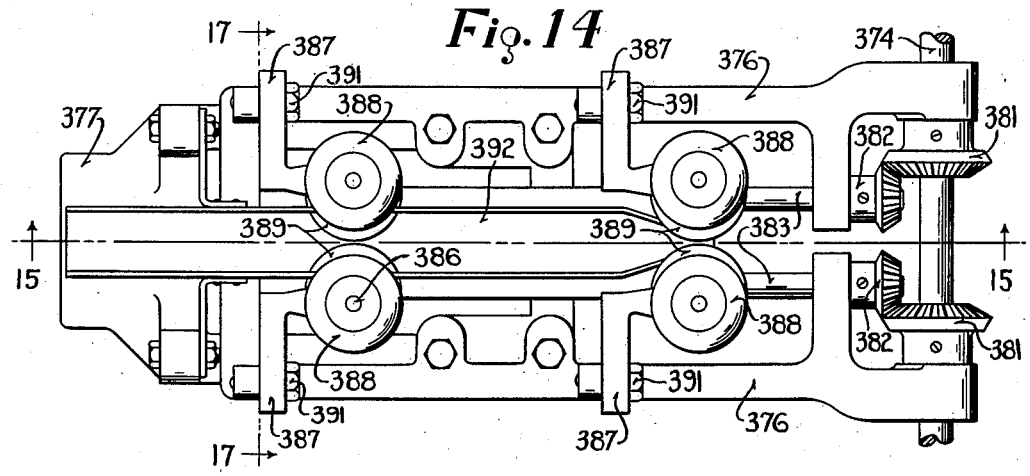
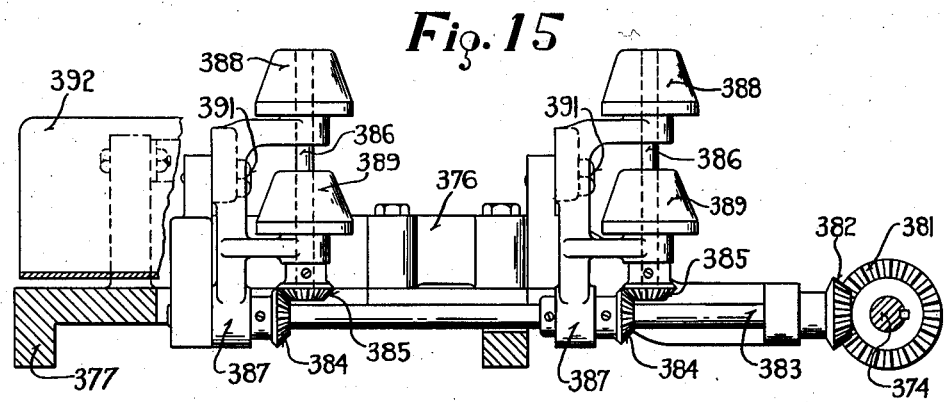
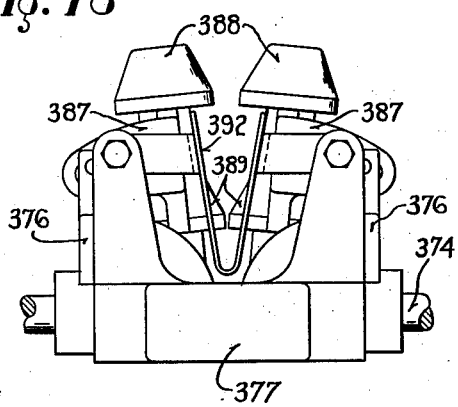
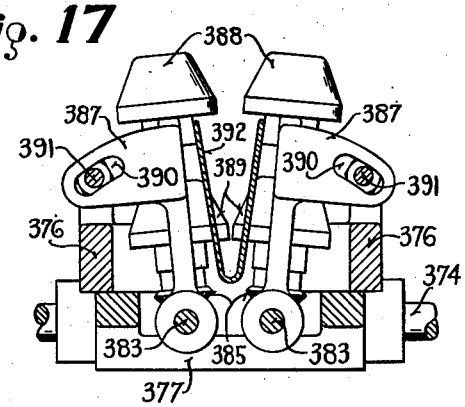

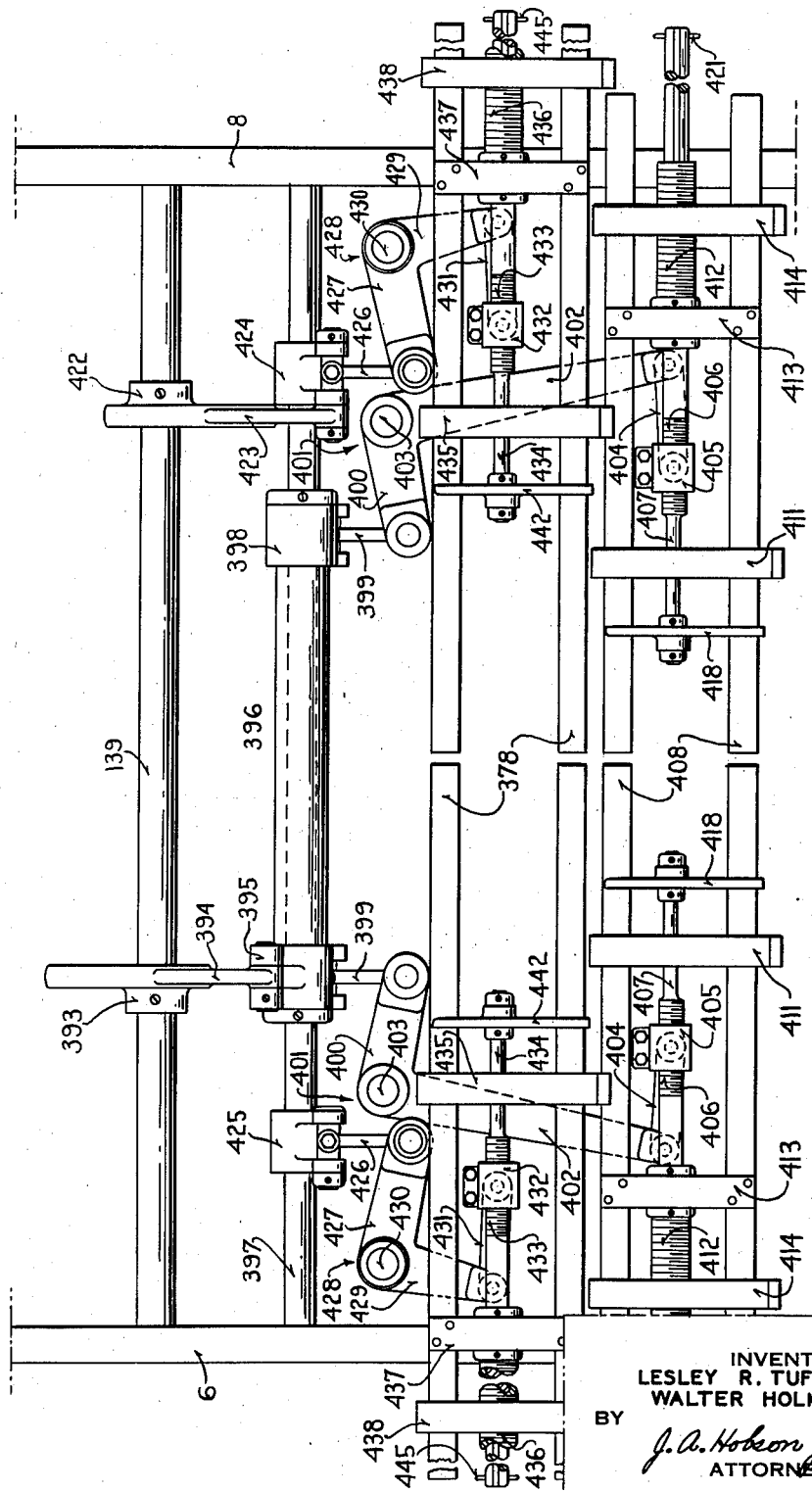

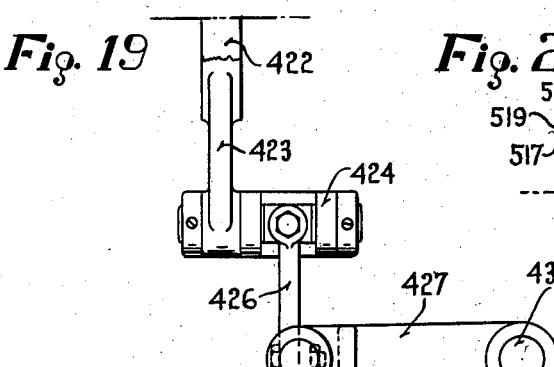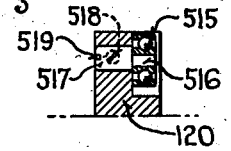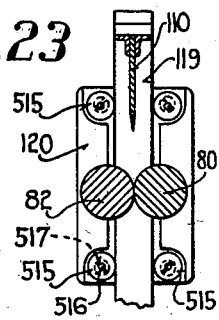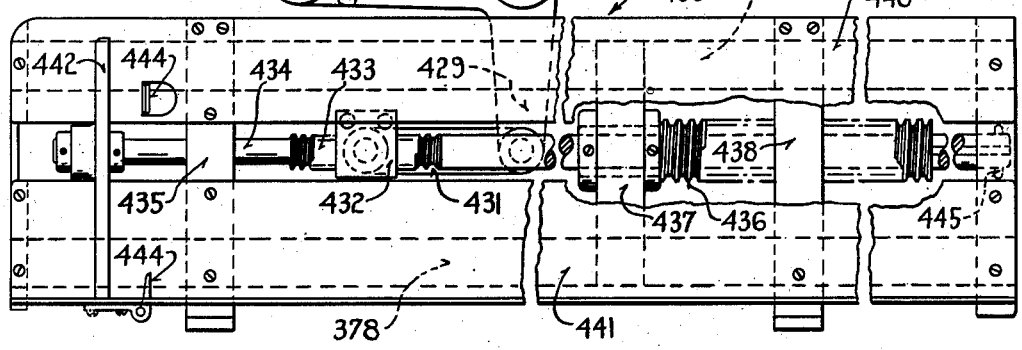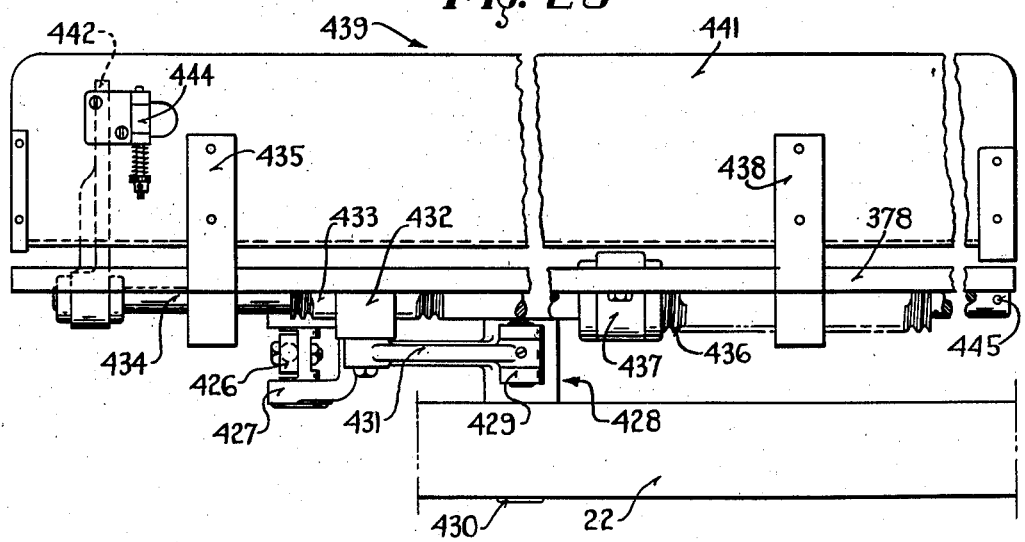

Patented Feb. 18, 1941

2,232,152

UNITED STATES PATENT OFFICE 2,232,152

FOLDING MACHINE

Lesley R. Tufts, Hillsdale, N. J., and Walter Holms, Pearl River, N. Y., assignors to Dexter Folder Company, Pearl River, N. Y., a corporation of New York Application June 2, 1939, Serial No. 277,000

66 Claims. (Cl. 270—85)

This invention relates to folding machines and while capable of general use is more particularly adapted for folding printed sheets and producing therefrom book, magazine or similar signatures.

One object of the present invention is to provide a folding machine having improved mechanism for folding printed sheets and producing a plurality of signatures from each printed and folded sheet.

Another object of the present invention is to provide a folding machine having improved mechanism for folding printed sheets and producing from each printed and folded sheet a plurality of signatures certain of which are inserted in others.

Another object of the present invention is to provide a folding machine having improved printed sheet folding and signature making and associating mechanisms which may be selectively employed to simultaneously produce from each printed sheet a plurality of signatures having either sixteen pages or thirty-two pages.

Another object of the present invention is to provide a folding machine having improved folding mechanisms and adjustments therefor.

Another object of the present invention is to provide a folding machine having improved sheet folding, signature producing and signature registering or heading up devices.

Another object of the present invention is to provide a folding machine having improved sheet folding, signature producing, and signature feeding and packing mechanisms.

These and other objects of the present invention will appear from the following description thereof and in order to more clearly understand said invention reference may be had to the accompanying drawings illustrating one embodiment thereof.

In said drawings:

Figs. 1 and 1ª are complementary side elevations of a folding machine embodying the present invention;

Figs. 2 and 2ª are complementary vertical longitudinal sectional views of the folding machine shown in Figs. 1 and 1ª.

Fig. 3 is a top plan view of folding mechanisms shown in Figs. 1ª and 2ª;

Fig. 4 is a top plan view, partly in section, of gearing and locking means therefor shown in Fig. 3;

Fig. 5 is a transverse vertical sectional view of the folding mechanisms shown in Fig. 3;

Fig. 13 is an enlarged top plan view of registering or heading up devices shown in Fig. 5;

Fig. 14 is an enlarged top plan view of signature delivering means shown in Figs. 1ª, 2ª, and 6;

Fig. 15 is a vertical longitudinal sectional view on the line 15—15 of Fig. 14;

Fig. 16 is a front elevation of the signature delivering means shown in Figs. 14 and 15;

Fig. 17 is a transverse vertical sectional view on the line 17—17 of Fig. 14;

Fig. 18 is an enlarged top plan view of operating mechanism for the pushers of signature packer boxes shown in Figs. 1ª, 2ª, and 6;

Fig. 19 is an enlarged top plan view of one of the signature pushers and packer boxes shown in Figs. 2ª and 6;

Fig. 20 is a front elevation of the signature packer box shown in Fig. 19;

Fig. 21 is a detail perspective view illustrating diagrammatically the operations performed on a printed sheet to simultaneously produce therefrom four sixteen page signatures;

Fig. 22 is a detail perspective view illustrating diagrammatically operations performed on a printed sheet to simultaneously produce therefrom two thirty-two page signatures;

Fig. 23 is a side elevation of slide and blade adjusting and guiding devices; and Fig. 24 is an enlarged detail cross section of one of the devices shown in Fig. 23.

Figure 1:
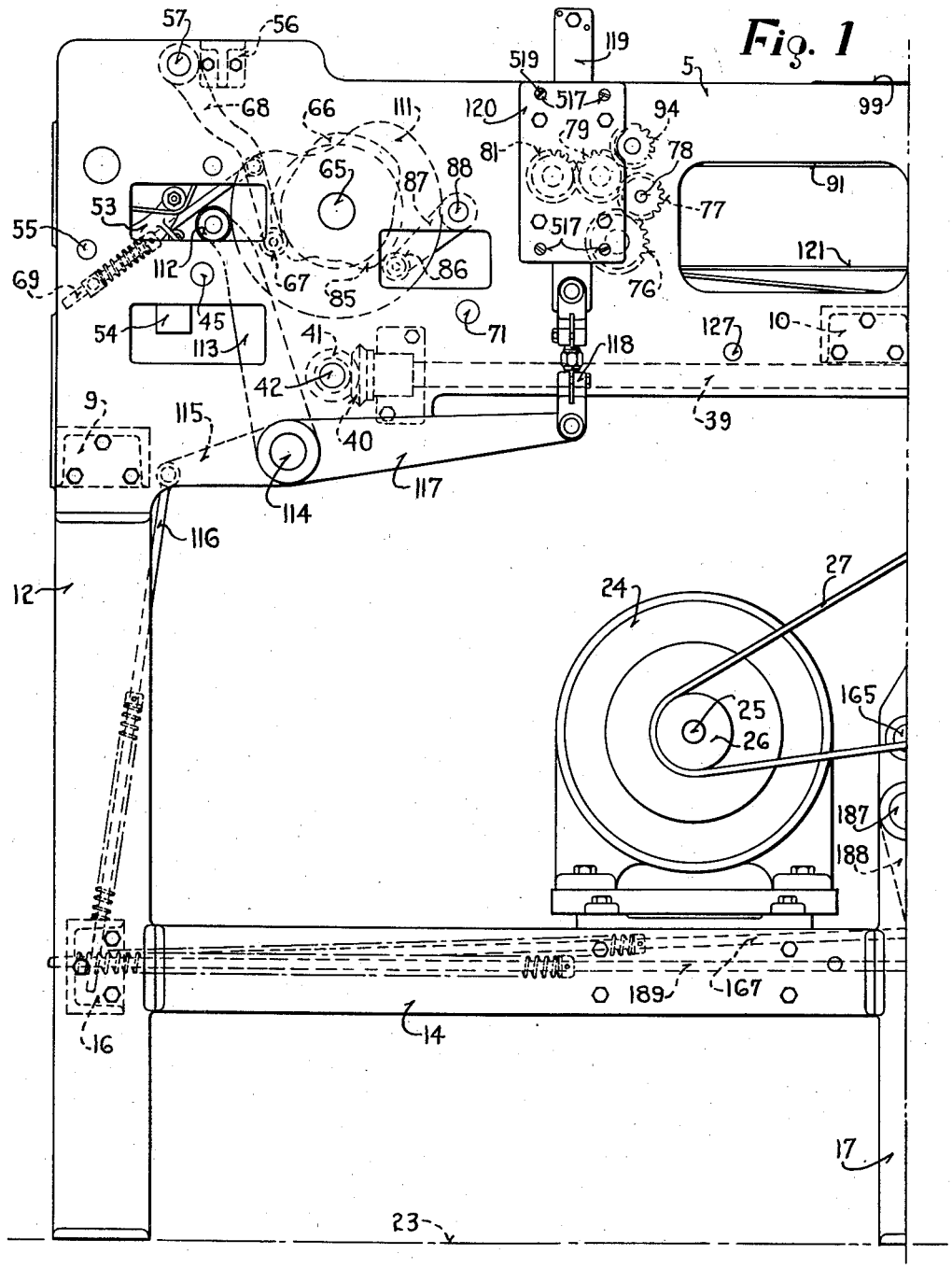

In the drawings like reference characters indicate like parts throughout the several views and referring first to Figs. 21 and 22 the same illustrate diagrammatically the operations performed by the present machine upon a printed sheet to produce therefrom four sixteen page signatures or two thirty-two page signatures. In Fig. 21, for example, the sheet A initially has a first fold B made therein transversely thereof and is fed downwardly and then forwardly to a position where said sheet has made therein transversely thereof, and through its double thickness, a line of perforations C. The once folded and perforated sheet is then fed forward a short distance (not indicated in Fig. 21) to a position where said sheet has made therein transversely thereof a second fold D parallel with the first fold B.

Upon making of the second fold D the twice folded sheet is fed downwardly and cut into four twice folded sections, the outer sections being indicated at 1 and the inner sections being indicated at 2. The inner and outer sections 1 and 2 are then fed forwardly along upper and lower levels respectively to positions where said sections have simultaneously made therein, at right angles to their other folds, third folds indicated at E. The folds E form the backs of four sixteen page signatures produced when said folds are made in the sections 1 and 2, the two outer signatures being indicated at 3 and the two inner signatures being indicated at 4. Upon making of the folds E and forming of the sections 1 and 2 into signatures, the outer sixteen page signatures 3 and the inner sixteen page signatures 4 are fed downwardly and then delivered to the inclined positions thereof shown at the bottom of Fig. 21.

In Fig. 22, for example, the procedure illustrated is the same as described above in connection with Fig. 21 up to the formation and forward feeding of the twice folded outer and inner sheet sections 1 and 2. Fig. 22, however, thereafter shows the procedure followed in the making of two thirty-two page signatures from a printed sheet and in this case the forwardly fed inner sheet sections 2 are fed from their lower levels in opposite directions transversely of the machine and under the forwardly fed outer sheet sections 1 then standing on their upper levels. Thereupon the superposed sections 1, 2 have the third folds E simultaneously made therein at which time the sections are formed into sixteen page signatures and the two sixteen page signatures produced from sections 1 are inserted in the two sixteen page signatures produced from sections 2 thus forming two thirty-two page signatures indicated at 4'. Upon formation of the two thirty-two page signatures 4' as described, they are fed downwardly and delivered to the inclined positions thereof shown at the bottom of Fig. 22.

Proceeding now with a detail description of the present machine, the parts thereof are mounted on a frame comprised by side members 5, 6 at one side of the machine and side members 7, 8 at the opposite side thereof (Figs. 1 to 3, inclusive, 5 and 6). The frames 5 and 7 are connected together at the front and rear thereof by cross members 9 and 10 bolted or otherwise suitably secured thereto. The frames 5 and 7 have their forward ends bolted or otherwise suitably secured to the rear upper portions of the frames 6 and 8 and said frames 6 and 8 are connected together at their upper forward portions by a cross member 11 bolted or otherwise suitably secured thereto.

The frames 5 and 7 have bolted or otherwise suitably secured thereto at the rear and bottoms thereof legs 12 and 13 which, in turn, have bolted or otherwise suitably secured thereto the rear ends of longitudinally extending tie members 14 and 15 the forward ends of which are bolted or otherwise suitably secured to the rear bottom portions of the frames 6 and 8. The legs 12 and 13 are connected together by a cross member 16 bolted or otherwise suitably secured thereto and the frames 6 and 8, which are provided with legs 17, 18 and 19, 20, are connected together by cross members 21 and 22 bolted or otherwise suitably secured thereto.

The frame of the machine, comprised by the above described parts, may be bolted or otherwise suitably secured to the floor or other machine foundation 23 where said machine is installed. The movable parts of the machine are operated by any suitable means herein shown as an electric motor 24 (Fig. 1) supported on and secured to the forward end of tie member 14 in any suitable manner. Electric current is supplied to the motor 24 from any suitable source and starting and stopping of the motor and all parts of the machine driven thereby is effected by a suitable switch (not shown).

The armature shaft 25 of motor 24 has fixed thereon a small pulley 26 around which passes a belt 27 that also passes around a large pulley 28 (Figs. 1ª and 3), fixed on the main driving shaft 29 of the machine. The main driving shaft 29 extends transversely of the machine and is journalled in suitable bearings on the frames 6 and 8. This shaft 29 is also journalled in any suitable manner in a center support 30 (Figs. 2ª and 3) that is bolted or otherwise suitably secured to the cross members 21 and 22. Shaft 29 is provided on one end thereof with a hand wheel 31 by which said shaft and the parts driven therefrom may be turned over by hand for setting and adjustment purposes.

Printed sheets folded and made into signatures by the machine may be fed thereto in any suitable manner as, for example, by an automatic sheet feeder (not shown) disposed at the rear of the machine and acting to feed the sheets in succession to timed sheet conveying or feeding means preferably operated and comprised by the following instrumentalities.

Fixed on the shaft 29 exteriorly of frame 6 is a spur pinion 32 (Figs. 1ª and 3) which meshes with a spur gear 33 that is also disposed exteriorly of frame 6. This spur gear 33 is journalled on a stub shaft 34 secured in any suitable manner on frame 6 and projecting outwardly therefrom to receive said gear. The spur gear 33, in turn, meshes with a similar gear 35 also disposed exteriorly of frame 6 and fixed on a short shaft 36 journalled in a suitable bearing on frame 6 and projecting outwardly therefrom to receive said gear. Shaft 36 projects inwardly from frame 6 and said shaft has fixed on its inwardly projecting end a bevel gear 37. This bevel gear 37 meshes with a similar gear 38 that is fixed on one end of a horizontal shaft 39 journalled in suitable bearings on the frame 5 at the inner side thereof. Fixed on the opposite end of shaft 39 is a bevel gear 40 (Fig. 1) which meshes with a similar gear 41. The bevel gear 41 is fixed on a driven shaft 42 extending transversely of the machine and journalled in suitable bearings on the frames 5 and 7 thereof.

Fixed on the driven shaft 42 is a gear 43 (Fig. 2) which meshes with a gear 44 that is journalled on a stay shaft 45 near one end thereof. This stay shaft 45 extends transversely of the machine and is secured in any suitable manner on the frames 5 and 7 thereof. The gear 44 meshes with a gear 46 disposed near the frame 7 interiorly thereof and fixed on one end of a feed roller 47. This feed roller 47 extends transversely of the machine and is journalled in suitable bearings on the frames 5 and 7. Passing around feed roller 47 and driven thereby are tapes 48 which also pass around an idler roller 49 that extends transversely of the machine and is journalled in suitable bearings on the frames 5 and 7 thereof. The tapes 48 also pass over an idler roller 50 which extends transversely of the machine and has one end journalled in the frame 5 thereof. The opposite end of idler roller 50 is journalled on an arm 51 that is fixed on the stay shaft 45 adjacent the frame 7 of the machine. The tapes 48 also pass around weighted tape tightening rollers 52 journalled on arms 53 carrying tape tightening weights 54. The arms 53 are loosely mounted on a stay shaft 55 extending transversely of the machine and secured in any suitable manner on the frames 5 and 7 thereof.

Extending transversely of the machine near the top and rear thereof and bolted or otherwise suitably secured to the frames 5 and 7 is a stay bar 56. Disposed in like manner adjacent the stay bar 56 at the rear thereof is a rock shaft 57 having fixed thereon arms 58 the free ends of which have journalled therein a cross shaft 59. This cross shaft 59 has fixed thereon to rotate therewith timed drop rollers 60 that cooperate with the feed roller 47 and the tapes 48 to feed the sheets forwardly into the machine from the sheet feeder or other source of sheet supply.

The drop rollers 60 are raised and lowered at predetermined intervals in timed relation with feeding of the sheets into the machine and this is preferably accomplished by the following instrumentalities. Fixed on the driven shaft 42 near the frame 7 between the latter and the gear 43 is a spur pinion 61 (Fig. 2) which meshes with and drives a similar pinion 62. The spur pinion 62 is journalled on a stub shaft 63 secured to the frame 7 in any suitable manner and said pinion meshes with a gear 64 also located near the frame 7 and fixed on a cam shaft 65. This cam shaft 65 extends transversely of the machine and is journalled in suitable bearings on the frames 5 and 7 thereof. Fixed on the cam shaft 65 near frame 5 and driven by said shaft is a cam 66 (Fig. 1) having engaged therewith a roller 67 that is journalled on an arm 68 fixed on the rock shaft 57. The roller 67 is maintained in engagement with the cam 66 by a spring pressed rod 69 one end of which is pivotally connected with the arm 68 and the opposite end of which is guided in any suitable manner on the frame 5 of the machine. It will thus appear that the arm 68 is cam operated in one direction and spring operated in the opposite direction which causes rocking of the shaft 57 and raising and lowering of the drop rollers 60. When a sheet is fed into the machine onto the tapes 48, the drop rollers 60 are raised whereupon they immediately lower to assist the feed roller 47 and said tapes in feeding the sheet to further conveying means and to first sheet folding mechanism preferably operated and comprised by the following instrumentalities.

Meshing with and driven by the gear 43 is a gear 70 (Fig. 2) disposed near the frame 7 and journalled on a stay shaft 71. This stay shaft 71 extends transversely of the machine and is secured in any suitable manner on the frames 5 and 7. The gear 70 meshes with and drives a gear 72 secured on one end of a tape roller 73 and serving to drive the same. This tape roller 73 also extends transversely of the machine and is journalled in suitable bearings on the frames 5 and 7 thereof. Meshing with and driven by the gear 72 is a gear 74 fixed on one end of another tape roller 75 and serving to drive the same. This tape roller 75 extends transversely of the machine in spaced parallel relation with the tape roller 73 and is journalled in suitable bearings on the frames 5 and 7. Fixed on the end of the roller 75 opposite that carrying the gear 74 and disposed adjacent the frame 5 is a gear 76 (Fig. 1) which meshes with and drives an idler gear 77. This idler gear is journalled on a stub shaft 78 secured to and projecting inwardly from the frame 5, and said idler gear meshes with and drives a gear 79. The gear 79 is fixed on one end of a folding roller 80 (Fig. 2) which is thus driven by the idler gear 77. The folding roller 80 extends transversely of the machine and is journalled in suitable bearings on the frames 5 and 7 thereof. The gear 79 (Fig. 1) meshes with a gear 81 fixed on one end of a folding roller 82 (Fig. 2) which is thus driven from the folding roller 80. The folding roller 82 extends transversely of the machine in parallel relation with the folding roller 80 and is journalled in suitable bearings on the frames 5 and 7. Rollers 80 and 82 cooperate in the folding of sheets and their bearings may be relatively displaceable in the usual manner to enable sheets of various thicknesses to pass between said rollers.

Extending transversely of the machine above the rollers 80, 82 in spaced relation therewith is a folding plate comprised by a fixed bar 83 and a movable bar 84 (Fig. 2). The bars 83 and 84 are supported in any suitable manner on the frames 5 and 7 and as each sheet is fed forwardly by the tapes 48 bar 84 is moved toward bar 83 to close the space therebetween and enable the sheet to pass thereover without interference. After the sheet has passed over bars 83, 84 and moved into proper position for folding, bar 84 moves away from bar 83. These movements of bar 84 are preferably accomplished by means operated by and including the following instrumentalities.

Fixed on and driven by the shaft 65 is a cam 85 (Fig. 1) that is disposed near the frame 5. This cam 85 has engaged therewith a roller 86 journalled on an arm 87 that is fixed on a rock shaft 88 extending transversely of the machine and journalled in suitable bearings on the frames 5 and 7 thereof. The roller 86 is maintained in engagement with cam 85 by a spring pressed rod (not shown) pivotally connected with arm 87 and guided in any suitable manner on the frame 5 of the machine. The rock shaft 88 is thus cam operated in one direction and spring operated in the opposite direction. Rock shaft 88 has secured on each end thereof an arm 89 (Fig. 2), and bar 84 has pivotally connected with each end thereof one end of a link 90 the opposite end of which is pivotally connected with the adjacent arm 89. It will thus appear that through rocking of shaft 88 by the means described for this purpose, bar 84 will be moved toward and away from bar 83 through the described connections for the bar 84 with said shaft.

Each sheet is fed forwardly by tapes 48 over bars 83, 84 onto driven tapes 91 (Figs. 2 and 2ª) that carry the sheet into position for folding thereof between said bars and the rollers 80, 82. The tapes 91 are driven at the same surface speed as that of the tapes 48 and for this purpose tapes 91 pass around a driven roller 92 and idler rollers 93. Roller 92 extends transversely of the machine and is journalled in suitable bearings on the frames 5 and 7 thereof. The roller 92 is driven from roller 80 by gear 79 (Fig. 1) which meshes with a gear 94 fixed on the roller 92. Idler rollers 93 (Fig. 2ª) are journalled on arms 95 which are adjustable lengthwise of the machine to maintain proper tension on tapes 91. For this purpose arms 95 are adjustably clamped on a bar 96 which extends transversely of the machine and is secured in any suitable manner on the frames 5 and 7.

The sheet is carried forwardly by the tapes 91 until its leading edge engages front registering means which arrests the movement of the sheet and holds it in position for the making of a first transverse fold therein as hereinafter described. This front registering means is comprised by sheet stops or gage fingers 97 (Fig. 2a) extending in alinement transversely of the machine between the tapes 91 and projecting below the upper reaches thereof. The stops or fingers 97 are adjustably mounted on a bar 98 extending transversely of the machine and mounted on and having screw threaded engagement with screw shafts 99. The shafts 99 are journalled in and held against displacement relative to brackets 100 that are bolted or otherwise suitably secured on a bar 101. This bar 101 extends transversely of the machine and has its opposite ends secured in any suitable manner to the frames 6 and 8. Shafts 99 have fixed thereon hand wheels 102 and spiral gears 103. Spiral gears 103 mesh with spiral gears 104 that are fixed on a shaft 105 extending transversely of the machine and journalled in suitable bearings in the brackets 100.

The shaft 105 is made in two parts that may be connected or disconnected by suitable means for this purpose (not shown). Upon such disconnection of the parts of shaft 105 either of the hand wheels 102 may be operated independently of the other for similar operation of the shafts 99 and adjustment of the sheet stops or gage fingers 97. When the parts of shaft 105 are connected shafts 99 may be simultaneously operated to likewise adjust the fingers 97 and this is accomplished by a handle 106 fixed on a short shaft 107 journalled in one of the brackets 100 and carrying a gear 108 which meshes with a gear 109 on one of the parts of shaft 105. The aforesaid adjustments of the stop or gage fingers 97 are made in accordance with the size of the sheet and to insure that regardless of its size it will be in proper position for making therein of the first or transverse fold. Assuming that the stops or gage fingers 97 have been properly adjusted for the making of the first or transverse fold in a given size sheet, the leading edge of said sheet fed forwardly by the tapes 91 engages the stops or gage fingers 97 and the sheet is thereby arrested and held in proper position for the making of said fold therein.

At this time the sheet is tucked between the bars 83, 84 and rollers 80, 82 by a timed folding knife 110 (Fig. 2) and a first transverse fold is thus made in the sheet. The knife 110 extends transversely of the machine and is preferably operated by and mounted on the following instrumentalities. Fixed on and driven by shaft 65 is a cam 111 (Fig. 1) with which is engaged a roller 112. Cam 111 is located near frame 5 and roller 112 is journalled on an arm 113 likewise located. Arm 113 is fixed on a rock shaft 114 extending transversely of the machine and journalled in suitable bearings in the frames 5 and 7 thereof. Rock shaft 114 has fixed thereon an arm 115 having pivotally connected therewith one end of a spring pressed rod 116 the opposite end of which is suitably guided in an opening in cross member 16. It will thus appear that the arm 113 and the rock shaft 114 are cam operated in one direction and spring operated in the opposite direction. The opposite ends of shaft 114 project outwardly from frames 5 and 7 and fixed on the outwardly projecting ends of said shaft exteriorly of said frames are arms 117. The arms 117 have pivotally connected therewith the lower ends of adjustable links 118 the upper ends of which are pivotally connected with the lower ends of slides 119. The slides 119 are mounted for vertical reciprocating motion on the outer sides of frames 5 and 7 in guides 120 that are bolted or otherwise suitably secured to said frames. The knife 110 (Fig. 2) is secured in any suitable manner on the upper ends of the slides 119 and the slides 119 are reciprocated vertically by the described connections therefor with rock shaft 114 to raise and lower said knife at proper intervals for folding of sheets in succession by the knife in conjunction with the bars 83, 84 and the rollers 80, 82.

Each sheet A having the fold B (Fig. 21) made therein by the knife 110 and rollers 80, 82 is delivered by the latter between the tape roller 75 and tapes 121 passing therearound (Figs. 2 and 2a). The tapes 121 also pass around the driven tape roller 73, which serves to drive said tapes, and around idler rollers 122 and 123 and weighted tape tightening rollers 124. The idler rollers 122 and 123 extend transversely of the machine and are journalled in any suitable manner in the frames 6, 8 and 5, 7, respectively. The weighted tape tensioning rollers 124 are journalled on arms 125 that carry weights 126, the arms 125 being loosely mounted on a stay shaft 127 which extends transversely of the machine and is secured in any suitable manner on the frames 5 and 7.

The once folded sheets are fed in succession by the tapes 121 over a slotted die plate 128, a slotted fold plate 129 and longitudinally extending laterally spaced sheet supporting bars 130 (Fig. 2a) into position for the action of timed perforating mechanism hereinafter described and which acts to perforate each once folded sheet transversely and through the double thickness thereof along the line C (Fig. 21) where a second fold in said sheet is to be made. The die plate 128 is bolted or otherwise suitably secured on a bar 131 which extends transversely of the machine and is bolted or otherwise suitably secured on the frames 6 and 8. The fold plate 129 likewise extends transversely of the machine forwardly of and in slightly spaced relation with die plate 128 and said fold plate is bolted or otherwise suitably secured on the frames 6 and 8. The sheet supporting bars 130 are clamped or otherwise suitably secured in position on a bar 132 which extends transversely of the machine and, in turn, is bolted or otherwise suitably secured on the frames 6 and 8. Bars 130 are further supported by the fold plate 129 on which the rear ends of said bars rest.

Extending in alinement transversely of the machine and projecting downwardly between the bars 130 are stops or gage fingers 133. These stops or gage fingers have reciprocating motion longitudinally of the machine. At the limit of their rearward movement, indicated in dotted lines in Fig. 2a, the stops or fingers 133 act to engage the leading folded edge of the once folded sheet fed on to bars 130 by tapes 121 and temporarily stop said sheet for the action thereon of the timed sheet perforating mechanism above referred to.

The stops or gage fingers 133 are preferably operated by and mounted on the following instrumentalities. Located adjacent the upper end of the center support 30 (Fig. 2a) and fixed on and driven by the main driving shaft 29 is a small gear 134. This small gear 134 meshes with and drives a large gear 135 that is fixed on and drives a shaft 136 extending transversely of the machine and journalled in suitable bearings in the frame 6 and the center support 30. Fixed on and driven by the shaft 136 is a small gear 137 which meshes with and drives a large gear 138. This large gear 138 is fixed on and drives a cam shaft 139 extending transversely of the machine and journalled in suitable bearings in the frame 6, the center support 30, and the frame 8. Fixed on and driven by the shaft 139 is a cam 140 (Fig. 1a) that engages a roller 141 journalled on one arm 142 of a bell crank 143 that is journalled on a rock shaft 144 extending transversely of the machine and journalled in any suitable manner on the frames 6 and 8 thereof.

The other arm 145 of bell crank 143 has pivotally connected therewith one end of a link 146 the opposite end of which is pivotally connected with an arm 147 fixed on a rock shaft 148 (Figs. 1a, 2a and 3) extending transversely of the machine and journalled in suitable bearings in the frames 6 and 8 thereof. This rock shaft 148 has fixed thereon an arm 149 to which is pivotally connected the upper end of a spring pressed rod 150 the lower end of which is guided in a suitable opening formed in the cross member 22. It will thus appear that the shaft 148 is cam operated in one direction and spring operated in the opposite direction through the described connections for said shaft with the cam 140 and rod 150. Fixed on and rocked by the shaft 148 are arms 151 connected as at 152 (Fig. 2a) with threaded rods 153 and imparting reciprocating motion thereto. The rods 153 are slidably mounted in bearings 154, 155 bolted or otherwise suitably secured to the cross member 11 at the rear and front thereof respectively. Mounted on and having threaded engagement with the rods 153 are brackets 156 the lower ends of which have bolted or otherwise suitably secured thereto a bar 157 extending transversely of the machine above the laterally spaced supports 130. The stops or gage fingers 133 are clamped or otherwise suitably secured on the bar 157 and it will thus appear that through reciprocating motion imparted to the rods 153, similar motion is imparted to the bar 157 and the stops or gage fingers 133.

The rods 153 are provided with hand wheels 158 for turning said rods and thereby adjusting the position of the stops or gage fingers 133 thereon. Either of the hand wheels 158 may be employed to adjust the stops or gage fingers 133 on the rods 153 and for this purpose both rods are connected by gearing comprising the following elements. The rods 153 slide through and are keyed to spiral gears 159 which mesh with similar gears 160 fixed on a shaft 161. This shaft 161 extends transversely of the machine and is journalled in suitable bearings on the brackets 155. It will thus appear that motion imparted to one rod 153 by turning its hand wheel 158 will be imparted to the other rod through the described gearing therebetween and that both rods will be turned to adjust the stops or gage fingers 133 through the described threaded connections for their brackets 156 with said rods.

Assuming now that the stops or gage fingers 133 have been moved rearwardly by the described means for this purpose to their dotted line position shown in Fig. 2a and that the once folded sheet has been carried forward by the tapes 121 to engage its leading and folded edge with said stops or gage fingers, said sheet is temporarily arrested by the stops or gage fingers and perforated transversely thereof along the line C (Fig. 21) where subsequently a second fold is made in the sheet. This perforating operation is accomplished through the medium of mechanism preferably operated and comprised by the following instrumentalities.

Fixed on and driven by the shaft 139 is a cam 162 (Fig. 1a) which engages a roller 163 journalled on an arm 164 fixed on a rock shaft 165 extending transversely of the machine and journalled in suitable bearings on the frame 6, the center support 30, and the frame 8. Rock shaft 165 also has fixed thereon an arm 166 having pivotally connected therewith one end of a spring pressed rod 167 (Fig. 1) the opposite end of which is guided in a suitable opening in cross member 16. It will thus appear that the rock shaft 165 is cam operated in one direction and spring operated in the opposite direction through the described connections for said shaft with the cam 162 and the rod 167.

The rock shaft 165 projects outwardly beyond the frames 6 and 8 and fixed on the outwardly projecting ends of said shaft exteriorly of said frames are arms 168 (Figs. 1a and 3). These arms 168 are rocked by the shaft 165 and thereby impart vertical motion to adjustable rods 169 having their lower ends pivotally connected with said arms. The upper ends of the rods 169 are pivotally connected with slides 170 that are vertically reciprocated by said rods and slidably mounted in guides 171 bolted or otherwise suitably secured to the frames 6 and 8. Extending transversely of the machine through suitable vertical elongated openings in the frames 6 and 8 thereof are heads 172 (Fig. 2a) that are bolted or otherwise suitably secured to the slides 170 and are vertically reciprocated thereby. These heads 172 have bolted or otherwise suitably secured thereto a timed perforator bar 173 which extends transversely of the machine above the slot in the die plate 128. Secured in any suitable manner in the under side of bar 173 and extending therealong in alinement with the slot in die plate 128 are perforator blades 174. These blades 174 are also alined with the slot between transversely extending spring controlled sheet clamps 175 mounted on the perforator bar 173 at opposite sides thereof.

Vertical and timed reciprocating motion of the slides 170 imparted thereto by the described means for this purpose imparts like motion to the bar 173, the blades 174, and the sheet clamps 175 and when the once folded sheet has been fed by tapes 121 across die plate 128 and bars 130 into engagement with the rearwardly positioned sheet stop or gage fingers 133 the bar 173 descends and the blades 174 perforate the sheet transversely thereof through its double thickness along the line C (Fig. 21) where a second fold D is to be made therein by a folding knife hereinafter described and which is raised at the time the perforating operation takes place.

Upon descent of the bar 173 the clamps 175 engage the sheet and clamp it against the die plate 128 to insure against displacement of the sheet during the perforating operation. When the perforator bar 173 rises, the clamps 175 first continue to bear on the sheet and strip it from the blades 174 whereupon said clamps rise with the bar 173 so that the next sheet to be perforated may pass under the perforating mechanism into position for action thereof on said sheet.

The bar 157 has mounted thereon in transverse alinement with the stops or gage fingers 133, a plurality of grippers 176 (Fig. 2a) disposed between certain of the sheet supporting bars 130 and each comprised by a fixed lower jaw 177 and a movable upper jaw 178. These grippers 176 are of well known construction operated by well known means such, for example, as disclosed in United States Patent No. 1,938,401 granted December 5, 1933 and needing no detail description herein. It is sufficient to say that in the rearmost position of the stops or gage fingers 133 the grippers 176 are open and the leading folded edge of the once folded sheet passes between the jaws of said grippers into engagement with the stops or fingers 133. After the sheet has been perforated the grippers 176 close and grip the sheet whereupon the stops or fingers 133 and the grippers are moved by the described stop or gage finger operating means to their forward position, the grippers carrying the sheet along with the stops until the line of perforations C (Fig. 21) in the sheet is disposed immediately over the transversely extending slot of fold plate 129 (Fig. 2a). At this time grippers 176 are opened and the sheet is side registered by suitable means for this purpose (not shown). Thereupon a second fold D (Fig. 21) is made in the sheet on the line of perforations C and parallel with the first fold B, by folding mechanism which is preferably operated and comprised by the following instrumentalities.

The gear 35 (Fig. 1a) meshes with and drives a gear 179 disposed exteriorly of the frame 6 and fixed on the outwardly projecting shaft of a folding roller 180 (Fig. 2a) which extends transversely of the machine and is journalled in suitable bearings on the frames 6 and 8 thereof. The roller 180 is thus driven from the gear 35 by gear 179. Fixed on the roller 180 interiorly of and adjacent the frame 8 is a gear 181 which meshes with and drives a gear 182 that is fixed on a folding roller 183 extending transversely of the machine and journalled in suitable bearings on the frames 6 and 8 thereof. The roller 183 is thus driven from the gear 181 by the gear 182. The bite of the rollers 180, 183 is disposed directly below the transversely extending slot in the fold plate 129.

Fixed on and rotated by the shaft 139 is a cam 184 (Fig. 1a) that engages a roller 185 journalled on an arm 186 that is fixed on a rock shaft 187 extending transversely of the machine and journalled in suitable bearings on the frame 6, the center support 30 and the frame 8. The rock shaft 187 has fixed thereon an arm 188 having pivotally connected therewith one end of a spring pressed rod 189 (Fig. 1) the opposite end of which is guided in a suitable opening formed in the cross member 16. It will thus appear that the rock shaft 187 is cam operated in one direction and spring operated in the opposite direction through the described connections for said shaft with the cam 184 and the rod 189.

The rock shaft 187 projects outwardly beyond the frames 6 and 8, and fixed on the outwardly projecting ends of said shaft exteriorly of said frames and rocked by the shaft are arms 190 (Figs. 1a and 3). The arms 190 have pivotally connected therewith the lower ends of adjustable rods 191 which are reciprocated vertically by said arms and have their upper ends pivotally connected with slides 192 (Fig. 1a) which are thus reciprocated vertically by said rods. The slides 192 are mounted in the guides 171, and projecting through suitable vertical elongated openings in the frames 6 and 8 are heads 193 (Fig. 2a) which are bolted or otherwise suitably secured to said slides and reciprocated vertically thereby.

Extending transversely of the machine and bolted or otherwise suitably secured to the heads 193 is a timed folding knife 194 disposed above and in alinement with the slot in the folding plate 129 and the bite of the folding rollers 180 and 183. The knife 194 is thus reciprocated vertically by the slides 192. The once folded sheet, as previously described, is perforated transversely whereupon the grippers 176 and the sheet stops 133 move forwardly, the grippers being closed and pulling the sheet into position under the knife 194 so that the line of perforations C (Fig. 21) across the sheet is in vertical alinement with said knife. The grippers 176 are then released from the sheet whereupon it is side registered by suitable means for this purpose (not shown) and the knife 194 descends and makes a second fold D in the sheet along the line of perforations C by forcing the sheet downwardly through the slot in fold plate 129 into the bite of the folding rollers 180 and 183. The knife 194 then rises whereupon the twice folded sheet is delivered by the folding rolls 180, 183 to mechanism which cuts the folded sheet into a plurality of folded sections herein shown as comprised by two outer sections 1 and two inner sections 2 (Fig. 21). This sheet cutting mechanism is preferably operated and comprised by the following instrumentalities.

Rotatably mounted in the frame 6, the center support 30 and the frame 8 is a shaft 195 (Figs. 2a and 3) having fixed thereon a frame indicated broadly at 196 and including arms 197 which normally stand vertically in the illustrated full line positions thereof. The cutting mechanism is driven from the gear 181 (Fig. 2a) on folding roller 180 and for this purpose said gear meshes with and normally drives a gear 198 journalled in any suitable manner near the frame 8 on one of the arms 197 at the top thereof. The gear 198 meshes with and drives a gear 199 that is fixed on a shaft 200 extending transversely of the machine and journalled in suitable bearings on the arms 197. This shaft 200 has fixed thereon and driven thereby rubber tired feed wheels 201 and pairs of metal collars (not shown) of the same diameter as said feed wheels, the collars of each pair being slightly spaced apart for the rotation therebetween of cutters hereinafter described.

The gear 199 meshes with and drives a gear 202 (Fig. 5) which is fixed on a shaft 203 extending transversely of the machine and journalled in suitable bearings on the arms 197. This shaft 203 has fixed on and rotated thereby rubber tired feed wheels 204 cooperating with the feed wheels 201, and serrated cutters 205 extending in the spaces between the pairs of metal collars above referred to that are fixed on and rotated by the shaft 200. The twice folded sheet is fed downwardly, with its folded edge D leading, between the feed wheels 201, 204 which further feed said sheet downwardly during which time the sheet is cut into four folded sections 1, 1 and 2, 2 (Fig. 21) that are received and fed forwardly in the machine by means for this purpose hereinafter described.

The machine is capable of feeding and folding sheets of various sizes and for producing four twice folded and cut sections from each twice folded sheet regardless of its size. The feed wheels 201, 204, the cutter collars, and the cutters 205 are therefore adjustable along their respective shafts to positions thereon determined by the particular size of the sheet and the particular size of the folded and cut sections produced therefrom. For this purpose, as well as for the purpose of replacing the cutters 205 when they become worn or dull, the frame 196 and all parts carried thereby may be swung rearwardly to inoperative positions thereof shown in dotted lines in Fig. 2ª at which time the aforesaid adjustments and replacements may be made. Means are accordingly provided for swinging frame 196 and the parts carried thereby to operative and inoperative positions and for locking the frame and parts in their operative positions. Said means are preferably comprised by the following instrumentalities.

The center support 30 (Figs. 2ª and 3) has formed integrally therewith at the top thereof a rearwardly projecting lug 206 on which is bolted or otherwise suitably secured a downwardly and rearwardly inclined bracket 207 having journalled therein a similarly inclined shaft 208 projecting from said bracket above and below the same. This shaft 208 has fixed on the lower projecting end thereof a hand wheel 209 provided with a handle 210. Shaft 208 also has fixed on its lower projecting end between the bracket 207 and the hand wheel 209 a collar 211 provided on its periphery with a shoulder 212 (Fig. 4) with which is normally engaged a detent 213 secured to or formed integrally with a lever 214 that is pivoted at 215 on the underside of bracket 207. Lever 214 is spring pressed in any suitable manner toward the shaft 208 to normally maintain detent 213 in engagement with shoulder 212 of collar 211 and thus prevent accidental turning of said shaft. Fixed on the upwardly projecting end of shaft 208 is a worm 216 which meshes with the teeth of an arcuate shaped rack 217 that is fixed on the rotatable shaft 195 to which the frame 196 is secured.

When it is desired to adjust the feeding and cutting elements on shafts 200, 203, the lever 214 is operated to disengage detent 213 from the shoulder 212 on collar 211. The wheel 209 is then turned by handle 210 in the proper direction to rotate shaft 208 and worm 216 so that rack 217, shaft 195 and frame 196 are swung rearwardly to bring said frame and the parts carried thereby to the inoperative positions thereof shown in dotted lines in Fig. 2ª. It will be recalled that the gear 198 is journalled on one of the arms 197 of frame 196, and it will thus appear that when said frame is swung rearwardly as described the gear 198 will swing with it, thus breaking the drive for the feeding and cutting mechanism on frame 196 with the gear 181 on folding roller 180. In order to prevent excess rearward swinging movement of frame 196 and the parts carried thereby, rack 217 has bolted or otherwise suitably secured on the top and front thereof a stop 218 which, when the frame is swung to its inoperative position, will engage the upper end of shaft 208 and prevent further rearward swinging movement of said frame and the parts carried thereby.

Adjustment of the parts on shafts 200, 203 having been made, wheel 209 is rotated by handle 210 in the proper direction so that worm 216 actuates rack 217 to swing frame 196 and the parts carried thereby forwardly to the operative positions thereof shown in full lines in Fig. 2ª. In swinging said frame and parts to their operative positions, the forward upper ends of arms 197 engage stop pins 219 threaded and adjustably secured in a stay shaft 220 extending transversely of the machine and secured in any suitable manner in the frames 6 and 8 thereof. Upon engagement of arms 197 with stop pins 219 further turning effort on wheel 209 creates torque on shaft 195 and the detent 213 engages shoulder 212 automatically by the spring pressure of lever 214 which is exerted thereon. Upon swinging movement of the frame 196 and parts carried thereby to their operative positions, gear 198 engages gear 181 and thus reestablishes the driving connections for the feeding and cutting mechanism on frame 196 with the folding roller 180. The torque, above referred to, produced on shaft 195 and engagement of detent 213 with shoulder 212 thus hold the parts on frame 196 positively in operative positions and positively maintain the driving connections for said parts with the folding roller 180.

It will be recalled that, as stated above, upon cutting of the twice folded sheet into four sections said sections are delivered to means for conveying them forwardly in the machine. This conveying means is preferably operated and comprised by the following instrumentalities. The gear 35 meshes with and drives a gear 221 (Figs. 1ª and 3) disposed exteriorly of the frame 6 and fixed on a shaft 222 which extends transversely of the machine and is journalled in suitable bearings in the frames 6 and 8 thereof. Shaft 222 has keyed to, adjustable therealong, and driven thereby upper and outer tape rollers 223 (Figs. 3, 5 and 7) each provided intermediate its opposite ends with an annular groove 224. Engaged in the grooves 224 of rollers 223 are the arcuate upper ends of roller shifting brackets 225 (Fig. 7) that are bolted or otherwise suitably secured on outer carriage 226 (Figs. 3, 5, 6 and 7) extending longitudinally of the machine at the front thereof and adjustable transversely of the machine by means for this purpose hereinafter described. Each carriage 226 is provided at the rear thereof in its underside with a transversely extending slot 227 (Fig. 7) and each carriage is provided at the front thereof in its underside with a transversely extending slot 228 the forward wall of which is beveled as indicated at 229.

Extending transversely of the machine and bolted or otherwise suitably secured thereto is an I-beam 230 (Figs. 2ª and 7). Disposed forwardly of the I-beam 230 in spaced parallel relation therewith is an I-beam 231 (Figs. 2ª, 6 and 7) that extends transversely of the machine and is bolted or otherwise suitably secured to the frames 6 and 8 thereof. The I-beam 231 has its front forward face bevelled as indicated at 232. The carriages 226 are slidably mounted on the I-beams 230, 231 for adjustment therealong transversely of the machine, the grooves 227 of said carriages being engaged over the top of I-beam 230 and the grooves 228 of the carriages being engaged over the top of I-beam 231 with the bevelled edges 229 and 232 in abutting relation.

Fixed on and driven by the shaft 222 is a gear 233 (Fig. 3) disposed near the frame 6 interiorly thereof. This gear 233 meshes with and drives a gear 234 that is fixed on and drives a shaft 235 extending transversely of the machine in parallel relation with shaft 222 and journalled in suitable bearings in the frames 6 and 8. Keyed to, adjustable along, and driven by the shaft 235 are additional upper and outer tape rollers 236. Each of these rollers 236 is provided in one end portion thereof with an annular groove 237. Engaged in the grooves 237 are the upper arcuate shaped ends of tape roller shifting brackets 238 (Fig. 7) that are bolted or otherwise suitably secured on the carriages 226 at the rear thereof.

Figure 6:
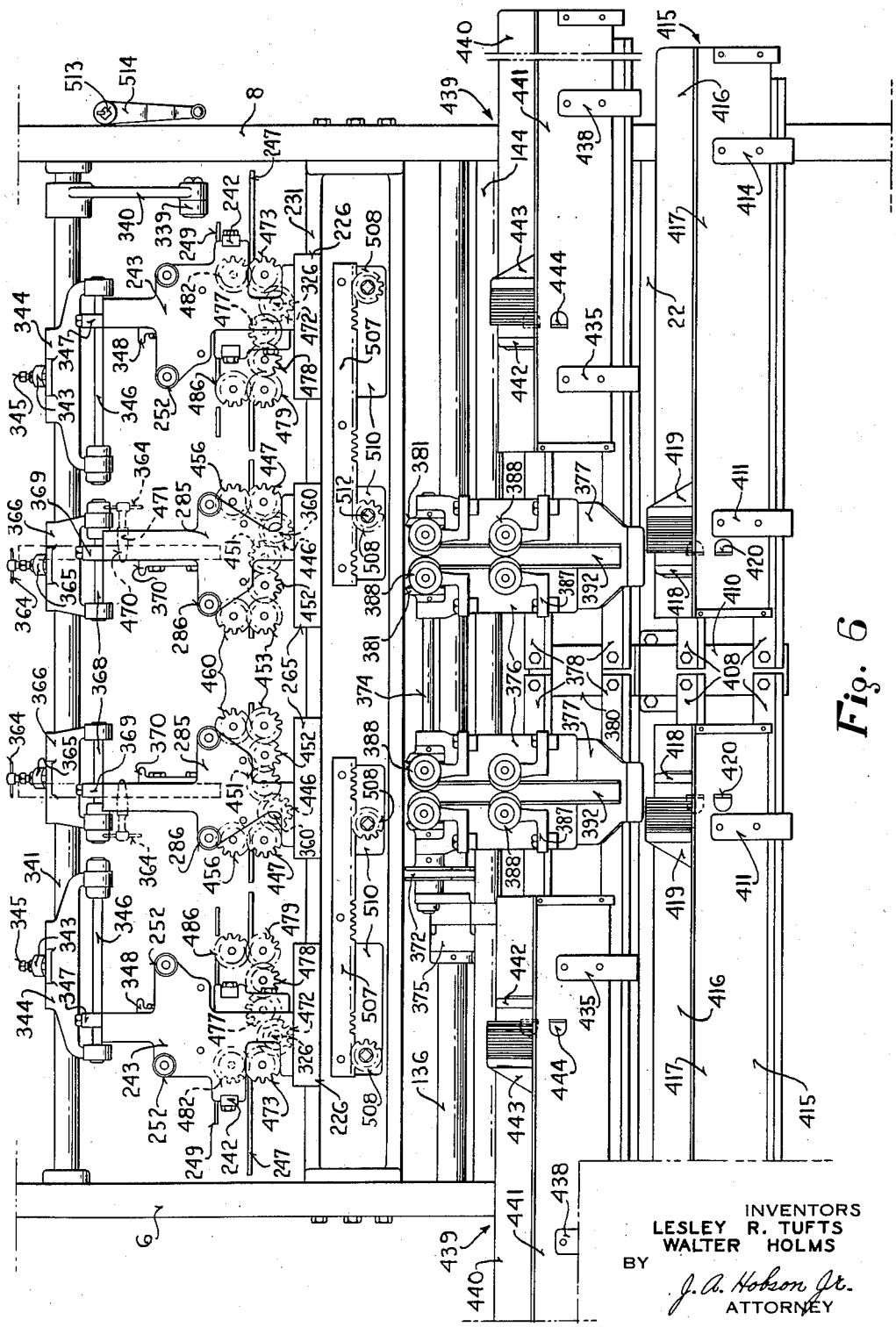
Fig. 6 is a front elevation of the folding machine shown in Figs. 1, 1ª and 2, 2ª.
Figure 7:
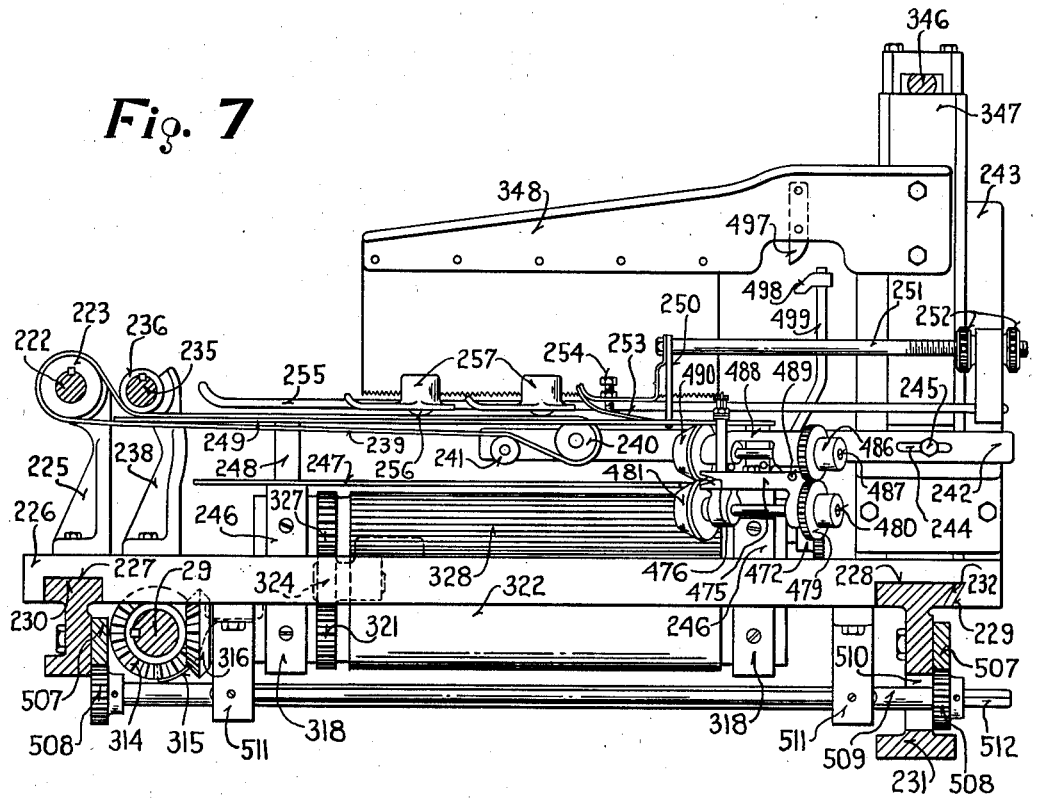
Fig. 7 is an enlarged side elevation of one of the outer folding mechanisms shown in Fig. 3.

Passing around tape rollers 223 and under and around tape rollers 236 and driven thereby are upper and outer tapes 239 (Figs. 3 and 7). The forward ends of the tapes 239 pass around idler rollers 240 and upwardly and rearwardly around idler rollers 241. The idler rollers 240, 241 are journalled in any suitable manner on bars 242 disposed horizontally in parallel relation and extending longitudinally of the machine. These bars 242 are mounted for forward and rearward adjustment, to regulate the tension of tapes 239, on opposite sides of brackets 243 (Figs. 3, 6 and 7). For this purpose the bars 242 are provided in their forward ends with slots 244 through which extend adjusting and supporting screws 245 (Fig. 7) having threaded engagement with the brackets 243 in suitable threaded openings formed in the opposite sides thereof.

The brackets 243 are bolted or otherwise suitably secured on the carriages 226 at the forward ends thereof and disposed longitudinally of the carriages 226 in spaced relation and bolted or otherwise suitably secured thereto are bearing brackets 246 (Fig. 7). These bearing brackets 246 have bolted or otherwise suitably secured thereto in spaced relation signature supporting plates 247 (Figs. 5 and 7). Bolted or otherwise suitably secured to the plates 247 and the brackets 246 are blocks 248. These blocks 248 have bolted or otherwise suitably secured thereto signature supporting plates 249 disposed above and in spaced relation with the plates 247. The upper reaches of the tapes 239 travel over the plates 249 and carry the upper and outer twice folded cut sheet sections 1, 1 (Fig. 21) therealong on upper levels to front stops or gages 250 (Fig. 7).

The stops or gages 250 are secured in any suitable manner on the inner ends of horizontally disposed rods 251 that extend longitudinally of the machine and are adjustable toward and away from the tape rollers 223, 236 in order to stop and properly position the upper and outer sheet sections 1, 1 for further folding thereof by mechanism hereinafter described. For this purpose rods 251 are supported in suitable openings formed in opposite sides of the brackets 243, the forward ends of said rods being threaded and provided at opposite sides of said brackets with adjusting and locking nuts 252. In order to prevent the upper and outer sheet section 1, 1 from rebounding from the stops or fingers 250 when fed thereagainst by tapes 239, rods 251 have secured thereon rearwardly of said stops or fingers spring fingers 253 that engage said sheet sections and the pressure thereon of which may be regulated, as desired, by adjusting screws 254.

Upward displacement of the sheet sections 1, 1 from the tapes 239 is prevented by top rods 255 (Figs. 3 and 7) disposed thereabove and projecting rearwardly from, and secured in any suitable manner to, the brackets 243. Frictional engagement of the sheet sections 1, 1 with the tapes 239 to insure feeding thereby of said sections toward and into engagement with the front stops or fingers 250 is obtained by metal or other suitable balls 256 rotatably supported above said tapes in suitable openings formed in holders 257 that are adjustably mounted on the rods 255.

The inner sheet sections 2, 2 (Fig. 21) delivered downwardly from the cutters by the feed wheels 201, 204 are also carried forward in the machine by suitable means for this purpose disposed on a level below that of the tapes 239 and preferably operated and comprised by the following instrumentalities. Fixed on and driven by the shaft 222 and disposed near the frame 6 interiorly thereof is a gear 258 (Fig. 3) which meshes with and drives a wide gear 259 journalled in any suitable manner on frame 6 at the inner side thereof. Gear 259 meshes with and drives a gear 260 disposed near the frame 6 at at the inner side thereof and fixed on and serving to drive a shaft 261 (Figs. 2ª and 10) which extends transversely of the machine directly below and in spaced parallel relation with shaft 222 and is journalled in suitable bearings in the frames 6 and 8. Keyed to, adjustable along, and driven by the shaft 261 are lower, inner tape rollers 262 (Figs. 3, 5 and 10) each of which is provided intermediate its opposite ends with an annular groove 263. Extending in the grooves 263 are the upper arcuate ends of tape roller adjusting brackets 264 that are bolted or otherwise suitably secured on inner carriages 265 (Figs. 3, 5, 6 and 10) extending longitudinally of the machine at the front thereof. The carriages 265 are provided at the rear thereof in their undersides with transverse extending slots 266 (Fig. 10) and said carriages are provided in their forward ends at the undersides thereof with transversely extending slots 267 the forward walls of which are beveled as indicated at 268. The carriages 265 are mounted on and slidable along the I-beams 230, 231 between the outer carriages 226, the slots 266 of the carriages 265 being engaged over the top of I-beam 230 and the slots 267 of said carriages being engaged over the top of I-beam 231 with the bevelled walls 268 disposed in abutting relation with the bevelled edge 232 of I-beam 231.

Fixed on and driven by shaft 261 and disposed near the frame 6 is a gear 269 (Fig. 3) which meshes with and drives a gear 270 that is fixed on and drives a shaft 271 (Figs. 2ª and 10) disposed below and in parallel relation with the shaft 235. This shaft 271 extends transversely of the machine and is journalled in suitable bearings on the frames 6 and 8. Keyed to, adjustable along, and driven by shaft 271 are additional, lower tape rollers 272 (Figs. 3, 5 and 10) each provided in one end portion thereof with an annular groove 273. Projecting in the grooves 273 of rollers 272 are the arcuate upper ends of roller shifting brackets 274 (Fig. 10) bolted or otherwise suitably secured to the inner carriages 265 at the rear thereof.

Figure 10:
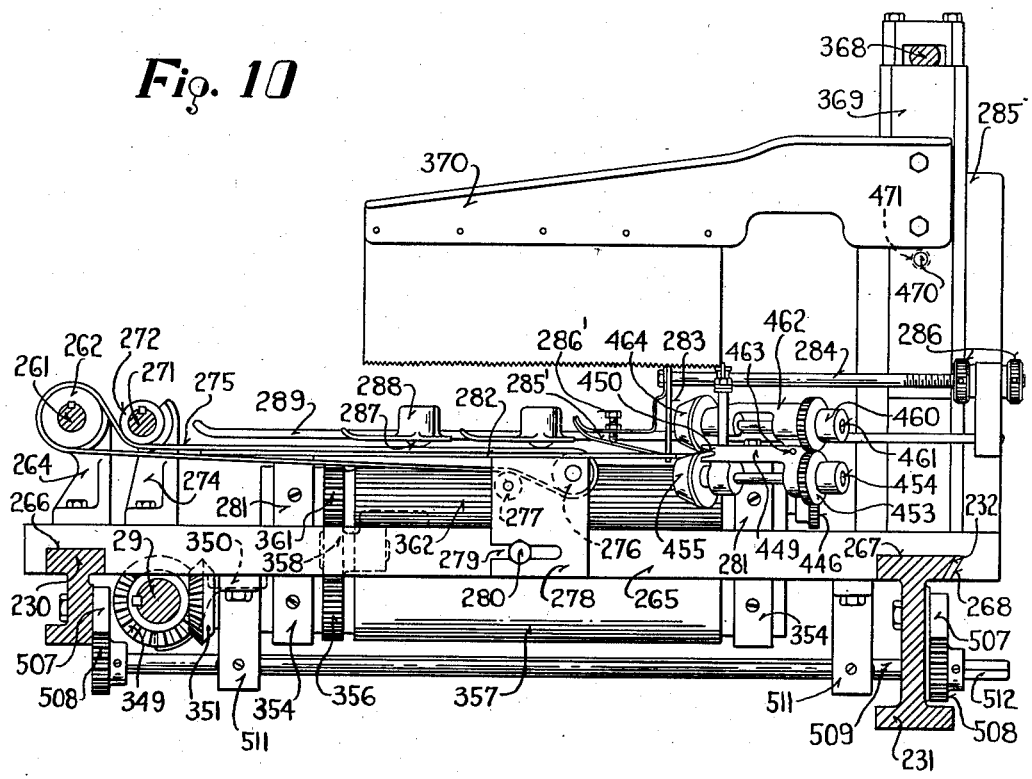
Fig. 10 is an enlarged side elevation of one of the inner folding mechanisms shown in Fig. 3.

Passing around the rollers 262 and under and around the rollers 272 and driven thereby are tapes 275 (Figs. 3, 5 and 10) disposed between the tapes 239 and on a lower level than that in which said tapes 239 are arranged. The tapes 275 pass around idler rollers 276 and upwardly and rearwardly around idler rollers 277 both of which are journalled in any suitable manner on vertical plates 278. The plates 278 are mounted on and adjustable along the sides of the inner carriages 265 in order to produce the proper tension on tapes 275. For this purpose, plates 278 are provided with slots 279 through which extend adjusting and clamping screws 280 having threaded engagement with suitable threaded openings formed in the sides of the carriages 265. Bolted or otherwise suitably secured on the carriages 265 in spaced relation longitudinally thereof are bearing brackets 281 (Fig. 10). These brackets 281 have bolted or otherwise suitably secured in laterally spaced relation on the tops thereof plates 282 (Figs. 3, 5 and 10) over which the tapes 275 travel and which are arranged at a level lower than that in which the plates 249 are arranged but in the same level as that in which the plates 247 are arranged.

The inner twice folded sheet sections 2, 2 (Fig. 21) are carried forwardly over plates 282 by the tapes 275 into engagement with front stops or gage fingers 283 (Fig. 10). These stops or gage fingers 283 are secured in any suitable manner on rods 284 extending loosely through suitable openings in brackets 285 (Figs. 3, 6 and 10) which are bolted or otherwise suitably secured on the inner carriages 265 at the forward ends thereof.

The rods 284 are threaded at their forward ends and the rods and the stops or fingers 283 may be adjusted longitudinally of the machine and secured in their positions of adjustment by adjusting and locking nuts 286 that are threaded on said rods at opposite sides of the brackets 285.

In order to prevent the lower and inner sheet sections 2, 2 from rebounding from the stops or fingers 283 when fed thereagainst by the tapes 275, rods 284 have secured thereon rearwardly of said stops or fingers spring fingers 285' that engage said sheet sections and the pressure thereon of which may be regulated, as desired, by adjusting screws 286'.

The inner twice folded sheet sections 2, 2 are maintained in engagement with tapes 275 by metal or other suitable balls 287 to insure feeding of said sections by said tapes forwardly over the plates 282 into engagement with the stops or gage fingers 283. These balls 287 are loosely mounted in suitable openings formed in ball holders 288 which are disposed over the tapes 275 and adjustably secured in position on top rods 289 under which the twice folded inner sheet sections travel. These top rods 289 are secured in any suitable manner on the brackets 285 and project rearwardly therefrom over and in spaced relation with the plates 282.

The outer twice folded sheet sections 1, 1 and the inner twice folded sheet sections 2, 2 may, in accordance with the present invention, be further folded independently of each other and delivered simultaneously from the machine or the inner twice folded sheet sections may be associated with the outer twice folded sheet sections and the two folded together and delivered simultaneously from the machine. When the outer and inner twice folded sheet sections are independently folded and delivered each of the same constitutes a sixteen page signature having a final right angle fold made therein by mechanism hereinafter described and with which the sheet sections are headed up or registered before making of the final fold therein. This header up or registering mechanism is preferably operated and comprised by the following instrumentalities.

Fixed on and driven by the shaft 139 is a cam 290 (Fig. 13) that engages a roller 291 journalled, as at 292, on one arm 293 of a bell crank 294 that is journalled on the rock shaft 144. The other arm 295 of the bell crank 294 has pivotally connected therewith one end of a spring pressed rod 296 the spring 297 for which is mounted on said rod between a collar 298 secured thereon and a short bar 299 having a suitable opening through which the rod 296 extends. The bar 299 is secured in any suitable manner on the side frame 8 and it will appear that the bell crank 294 is cam operated in one direction and spring operated in the opposite direction by the described connections for said bell crank with the cam 290 and the rod 296.

The forward end of the rod 296 is pivotally connected with an arm 300 (Figs. 5 and 13) that is secured on the lower end of a vertical rock shaft 301 journalled in suitable bearings on a bracket 302 that is bolted or otherwise suitably secured to the frame 8. The shaft 301 is thus rocked through the described connections therefor with the rod 296 and said shaft has fixed on its upper end and rotated in opposite directions thereby a gear 303 (Figs. 3 and 13) which meshes with teeth of racks 304 and 305 secured in any suitable manner to, or formed integrally with, parallel rods 306 and 307. The rods 306, 307 extend transversely of the machine at the front thereof and are slidably mounted in suitable bearings on the frames 6 and 8. Rotation of gear 303 in opposite directions imparts transverse, reciprocating motion to the rods 306, 307 and to registering or heading up devices 308, 309 that are secured on the rods 306 and 307.

As herein shown, each of the rods 306, 307 has a set of registering or heading up devices 308, 309 secured thereon, and projecting rearwardly and downwardly, the devices 308 being laterally alined with the inner edges of plates 249 and movable toward and away from the same, and the devices 309 being laterally alined with the outer edges of plates 282 and movable toward and away from the same (Fig. 5). Rods 306 and 307 have mounted thereon and secured in any desired position of adjustment therealong threaded sleeves 310 (Fig. 13), the devices 308, 309 being mounted on the sleeves 310 and secured thereon by locking and adjusting nuts 311. In order to prevent turning movement of rods 306, 307 during reciprocation thereof, said rods have secured thereto in any suitable manner and extending upwardly and vertically therefrom brackets 312 provided therein with suitable openings through which extend pins 313 projecting inwardly from frame 8 and secured thereto in any suitable manner.

As hereinbefore described, the outer twice folded sheet sections 1, 1 are fed forwardly by the tapes 239 over plates 249 into engagement with the stops or gage fingers 250, and the inner twice folded sheet sections 2, 2 are fed forwardly by tapes 275 over plates 282 into engagement with the stops or gage fingers 283. At this time the registering or heading up devices 308, 309 operate to head up or register the outer and inner sheet sections laterally with respect to further folding mechanism that will be presently described. This registration or heading up of the sections 1, 1 and 2, 2 is, in accordance with the present invention, effected by engagement of the heading up or registering devices with the cut edges of the outer and inner sections, the devices 308 engaging the inner cut edges of the outer sections 1, 1 and the devices 309 engaging the outer cut edges of the inner sections 2, 2. These edges project laterally from the plates 249 and 282 and upon outward movement of the devices 308 toward opposite sides of the machine said devices engage the inner cut edges of the outer twice folded sheet sections and displace them outwardly in opposite directions over plates 249 into position of registry with the further folding mechanism. Upon inward movement of the devices 309 toward each other, which occurs during outward movement of the devices 308, said devices 309 engage the outer cut edges of the inner twice folded sheet sections 2, 2 and displace them inwardly of the machine toward each other over the plates 282 and into position of registry with the further folding mechanism.

As above pointed out, the twice folded outer and inner sheet sections 1, 1 and 2, 2 (Fig. 21) may be further folded independently of each other and delivered simultaneously from the machine in the form of sixteen page signatures 3, 3 and 4, 4. Mechanism is accordingly provided for this purpose which makes a third fold E in each twice folded sheet section at right angles to the parallel folds B and D previously made therein. This further folding mechanism is preferably operated and comprised by the following instrumentalities.

Keyed to, adjustable along, and driven by the shaft 29 are bevel gears 314 (Figs. 3 and 7) the hubs of which are provided with annular grooves in which extend the arcuate shaped rearwardly projecting ends of brackets 315 that are bolted or otherwise suitably secured to the outer carriages 226 at the rear thereof. The bevel gears 314 mesh with and drive similar gears 316 that are fixed on the rearwardly projecting shafts of presser rollers 317 (Fig. 5) journalled in suitable bearings in brackets 318 (Figs. 7 and 8) spaced longitudinally of the carriages 226 and bolted or otherwise suitably secured thereto on the under sides thereof. The presser rollers 317 are disposed below openings or windows 319 (Fig. 5) in the carriages 226 and said presser rollers have fixed thereon and driven thereby gears 320 which mesh with and drive gears 321. The gears 321 are fixed on and drive presser rollers 322 disposed below the openings or windows 319 parallel and in cooperative relation with the presser rollers 317. The rollers 322 are journalled in yieldable and adjustable bearings 323 (Fig. 8) mounted on the brackets 318 and whereby said rollers 322 may yield relative to rollers 317 and be adjusted with respect thereto.

Figure 8:
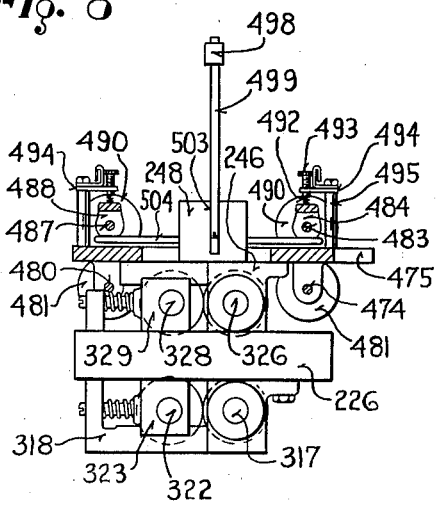
Fig. 8 is a front elevation of conveying, folding, and presser rollers shown in Fig. 7.

The gears 320 mesh with and drive idler gears 324 which are journalled in any suitable manner on the carriages 226 at the rear thereof. The idler gears 324 mesh with and drive gears 325 which are fixed on folding rollers 326, (Fig. 5) disposed above the openings or windows 319 in carriages 226 and journalled in suitable bearings in the brackets 246 (Figs. 7 and 8). The gears 325 mesh with and drive gears 327 (Fig. 5) which are fixed on and drive folding rollers 328 disposed above the openings or windows 319 in cooperative relation with the folding rollers 326 so that the bites between said rollers are disposed vertically above and in spaced relation with the bites between the presser rollers 317 and 322. The folding rollers 328 are journalled in yieldable and adjustable bearings 329 (Fig. 8) mounted on the carriages 226 and by which said rollers 328 may yield relative to rollers 326 and be adjusted with respect thereto. The bites between rollers 317, 322 and rollers 326, 328 are disposed below and in vertical alinement with knife receiving slots 330 and 331 formed between the plates 249 and 247 respectively.

Fixed on and driven by the shaft 139 is a cam 332 (Figs. 2ª and 3) which engages a roller 333 journalled on one arm 334 of a bell crank 335 the other arm of which is indicated at 336. Bell crank 335 is fixed on rock shaft 144 which also has fixed thereon an arm 337 having pivotally connected therewith one end of a spring pressed rod 338 the opposite end of which is guided in a suitable opening formed in a part of the frame of the machine, as for example, the cross member 16. It will thus appear that the shaft 144 is cam operated in one direction and spring operated in the opposite direction by the described connections for said shaft with the cam 332 and the spring pressed rod 338. Pivotally connected with the arm 336 of bell crank 335 is one end of a link 339 the opposite end of which is pivotally connected with an arm 340 fixed on a rock shaft 341 extending transversely of the machine near the top and front thereof and journalled in suitable bearings in the frames 6 and 8.

The rock shaft 341 has fixed thereon, as by set screws 342, small forked arms 343 disposed between the forked ends of yokes 344 (Figs. 3 and 6) that are loosely mounted on said rock shaft but rocked thereby through engagement with said yokes of set screws 345 on the forked ends of the arms 343. The yokes 344 have rotatably mounted in the forward forked ends thereof and held against endwise displacement by any suitable means transversely disposed rods 346 flattened on their upper and lower sides and extending loosely through suitable rectangular shaped openings formed in slides 347 (Figs. 3, 6 and 7). The slides 347 are mounted for vertical reciprocating movement in suitable guides formed in the brackets 243 which, as previously described, are bolted or otherwise suitably secured on the outer carriages 226. The slides 347 have bolted or otherwise suitably secured thereto timed folding knives 348 extending longitudinally of the machine rearwardly from said slides and at right angles to the timed folding knives 110 and 194. The folding knives 348 are disposed above and in vertical spaced alinement with the slots 330 and 331 of plates 249 and 247 and the bites between rollers 326, 328 and 317, 322. It will thus appear that knives 348 and slides 347 are reciprocated vertically through the described operating connections for said slides with the rock shaft 144 and the bell crank 335 which is fixed thereon and rocked thereby.

Figure 11:
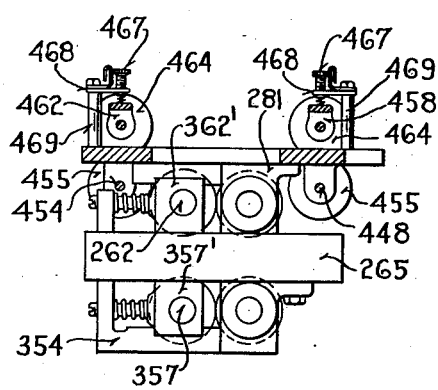
Fig. 11 is a front elevation of conveying, folding, and presser rollers shown in Fig. 10.

Keyed to, adjustable along, and driven by the shaft 29 are bevel gears 349 (Figs. 3 and 10) the hubs of which are provided with annular grooves having extending therein the arcuate shaped rearwardly projecting ends of brackets 350 that are bolted or otherwise suitably secured on the inner carriages 265 at the rear thereof. The bevel gears 349 mesh with and drive similar gears 351 that are fixed on the shafts of presser rollers 352 (Fig. 5) extending longitudinally of the carriages 265 below suitable openings or windows 353 formed therein. The presser rollers 352 are journalled in suitable bearings in brackets 354 (Figs. 10 and 11) spaced longitudinally of the carriages 265 and bolted or otherwise suitably secured thereto on the undersides thereof. Presser rollers 352 have fixed thereon and driven thereby gears 355 (Fig. 5) which mesh with and drive gears 356 that are fixed on presser rollers 357 disposed below openings or windows 353 parallel and in cooperative relation with presser rollers 352. The presser rollers 357 are journalled in suitable bearings 357' (Fig. 11) that are yieldably and adjustably mounted on the brackets 354 and which enable rollers 357 to yield relative to rollers 352 and be adjusted with respect thereto. Gears 355 on presser rollers 352 mesh with and drive idler gears 358 (Fig. 5) that are journalled in any suitable manner on the carriages 265 at the rear thereof.

Idler gears 358 mesh with and drive gears 359 which are fixed on and drive folding rollers 360 extending longitudinally of carriages 265 above the openings or windows 353 therein and journalled in suitable bearings in the brackets 281. Gears 359 mesh with and drive gears 361 that are fixed on and drive folding rollers 362 parallel and cooperating with rollers 360. Rollers 362 are journalled in suitable bearings 362' yieldably and adjustably mounted on the brackets 281 and whereby said rollers 362 may yield relative to the rollers 360 and be adjusted with respect thereto. The bites between presser rollers 352, 357 and folding rollers 360, 362 are in vertical alinement with each other and with folding knife receiving slots 363 between the plates 282.

Fixed on the rock shaft 341, as by taper pins 364 threaded therein, are small forked arms 365 (Fig. 3) disposed between the forked rear ends of yokes 366 (Figs. 3 and 6) that are loosely mounted on said rock shaft but rocked thereby through engagement of the yokes with set screws 367 on the forked forward ends of the arms 365. The yokes 366 have rotatably mounted in forked forward ends thereof and held against endwise displacement by any suitable means transversely disposed rods 368 flattened on their upper and lower sides and extending loosely, through suitable rectangular shaped openings formed in slides 369 (Figs. 3, 6 and 10). The slides 369 are mounted for vertical reciprocating motion in suitable guides formed in the brackets 285 which, as previously described, are bolted or otherwise suitably secured on the inner carriages 265. The slides 369 have bolted or otherwise suitably secured thereto timed folding knives 370 which project rearwardly from said slides and are disposed in spaced relation longitudinally of the machine and at right angles to the timed folding knives 110, 194. Folding knives 370 are disposed in vertical alinement with the slots 363 between plates 282 and it will appear that by the described operating connections for the knives 370 and the slides 369 with the rock shaft 341 that vertical reciprocating motion is imparted to said slides and said knives by said rock shaft.

As each series of outer and inner twice folded cut sheet sections 1, 1 and 2, 2 is delivered against stops or gages 250 and 283 and headed up by the devices 308, 309, the folding knives 348 and 370 (Fig. 5), which have been previously raised by their described operating mechanism, are now lowered thereby and the outer sections 1, 1 and the inner sections 2, 2 are tucked downwardly through slots 330, 331 and slots 363 into the bites of the folding rollers 326, 328 and 360, 362 which then act to fold said outer and inner sections at right angles to the two folds previously made therein so that each section now comprises a signature having sixteen pages. The outer and inner sixteen page signatures 3, 3 and 4, 4 are then delivered downwardly by the rollers 326, 328 and 360, 362 between the bites of the presser rollers 317, 322 and 352, 357 which, in turn, deliver the sixteen page signatures for reception in upper and lower packer boxes hereinafter described. The inner sixteen page signatures 4, 4 are first, however, delivered by the rollers 352, 356 into devices that feed and deliver the signatures into the lower packer boxes and these devices are preferably operated and comprised by the following instrumentalities.

Fixed on and driven by the shaft 136 in a pulley 371 (Fig. 1ª) around which passes a belt 372 driven by said pulley and also passing around and driving a pulley 373. The pulley 373 is fixed on and drives a shaft 374 (Figs. 1ª, 2ª, and 6) that extends transversely of the machine and is journalled in suitable bearings in a bracket 375. The bracket 375 is mounted on the shafts 136 and 144 and retained thereon against endwise displacement therealong by any suitable means for this purpose. The shafts 136 and 144 rotate freely in the bracket 375 and endwise displacement of the shaft 374 in the bracket 375 is prevented by any suitable means for this purpose. The shaft 374 is also journalled in suitable bearings in the rear upper ends of side members 376 of downwardly and forwardly inclined carriages 377 on which said side members are bolted or otherwise suitably secured (Figs. 2ª, 6 and 14 to 17). The carriages 377 are supported in forwardly and downwardly inclined positions on rails 378 which extend transversely of the machine near the front and bottom thereof. The rails 378 are bolted or otherwise suitably secured on brackets 379 (Fig. 1ª) and on a center bracket 380 (Fig. 2ª), the brackets 379 being bolted or otherwise suitably secured on the frames 6 and 8 and the bracket 380 being likewise secured on the cross member 22.

The carriages 377 and all parts carried thereby may be moved to different positions of adjustment along the shaft 374 and the rails 378 and said shaft has keyed thereto, adjustable therealong and driven thereby bevel gears 381 (Figs. 6, 14 and 15) that are disposed between and adjacent to the side members 376 of the carriages 377. Disposed between and driven by the bevel gears 381 are similar gears 382 that are fixed on and drive shafts 383 arranged in spaced parallel relation and extending longitudinally of the carriages 377. The shafts 383 are journalled in suitable bearings secured to or formed integrally with the side members 376. Fixed on and driven by the shafts 383 are bevel gears 384 which mesh with similar gears 385 that are fixed on and drive upwardly and outwardly inclined shafts 386. These shafts 386 are journalled in suitable bearings on upwardly and outwardly inclined arms 387 (Figs. 6 and 14 to 17, inclusive) mounted on shafts 383 and having suitable openings through which said shafts extend freely for rotation in said arms.

The shafts 386 have fixed thereon and rotated thereby upper conical rollers 388 and lower conical rollers 389 and said shafts, said rollers and the arms 387 may be adjusted about the shafts 383 toward and away from each other to vary the relative inclination of the rollers as desired. For this purpose the arms 387 are provided with arcuate shaped slots 390 through which extend locking and adjusting screws 391 threaded into suitable threaded openings formed in the side members 376 of carriages 377. The carriages 377 have extending longitudinally thereof between the conical rollers 388, 389 substantially V-shaped guides 392 that are bolted or otherwise suitably secured to said carriages near the forward ends thereof. The upper rear ends of the guides 392 have their side walls inclined inwardly and terminating between the upper rear rollers 388, 389 forwardly thereof, and the forward, lower rollers 389 extend into the guides 392 through suitable openings formed in the side walls thereof.

The carriages 377 and parts carried thereby having been adjusted along shaft 374 and rails 378 to proper positions immediately below the presser rollers 352, 357 (Fig. 5), the inner, sixteen page signatures 4, 4 are fed downwardly by said presser rollers between the conical rollers 388, 389 and into the guides 392. The conical rollers 388, 389 then feed the inner, sixteen page signatures 4, 4 through guides 392 and deliver said signatures into lower packer boxes which extend transversely of the machine and the operating mechanisms for and construction of which are preferably as follows.

Fixed on and driven by the shaft 139 is an eccentric 393 (Fig. 18) provided with a strap 394 that is pivotally connected with an arm 395 fixed on a sleeve 396. The sleeve 396 is rotatably mounted upon a rock shaft 397 centrally thereof and is held against endwise displacement upon said rock shaft by any suitable means for this purpose. The rock shaft 397 extends transversely of the machine and is journalled in any suitable manner on the frames 6 and 8 thereof. The sleeve 396 is rotated in opposite directions on the rock shaft 397 by the described connections for said sleeve with the eccentric 393. Fixed on and rocked by the sleeve 396 are arms 398 (Figs. 1ª, 2ª and 18) having pivotally connected therewith corresponding ends of links 399. The opposite ends of links 399 are pivotally connected with the arms 400 of bell cranks 401 that are disposed horizontally and have their other arms indicated at 402. The bell cranks 401 are journalled on short vertical stub shafts 403 secured in any suitable manner on the cross member 22 and projecting downwardly therefrom. Vertical displacement of the bell cranks 401 relative to the shafts 403 is prevented by any suitable means for this purpose.

The arms 402 of bell cranks 401 have pivotally connected therewith corresponding ends of links 404 (Fig. 18) the opposite ends of which are pivotally connected with interiorly threaded blocks 405 mounted upon and having threaded engagement with threaded portions 406 of pusher rods 407 which extend transversely of the machine between similarly extending spaced, parallel rails 408. The rails 408 (Figs. 1ª, 2ª and 18) are bolted or otherwise suitably secured on brackets 409 and on a bracket 410, the brackets 409 being bolted or otherwise suitably secured to the frames 6 and 8 and the bracket 410 being similarly secured to the cross member 22 centrally and at the front thereof. The rods 407 are arranged for reciprocation and rotation in suitable bearings formed in brackets 411 and in exteriorly threaded sleeves 412 that are journalled in suitable bearings in brackets 413 (Fig. 18). The rods 407 are keyed to and slidable along the sleeves 412 and endwise displacement of said sleeves in their bearings in brackets 413 is prevented by any suitable means for this purpose. The brackets 411 and similar brackets 414 are mounted upon and slidable along the rails 408 and the bracket 413 is bolted or otherwise suitably secured on said rails and prevented from movement longitudinally thereof. The threaded sleeves 412 extend through and have threaded engagement with suitable threaded openings formed in the brackets 414.

Lower packer boxes 415 are comprised by flat plates 416 and substantially V-shaped plates 417 arranged in spaced relation at opposite sides of and above the rods 407 (Figs. 1ª, 2ª, and 6). Plates 416 and 417 are bolted or otherwise suitably secured on the brackets 411, 414. The rods 407 have rotatably secured to their inner ends and projecting upwardly into the packer boxes 415 in the spaces between the plates 416, 417 thereof, signature pushers 418 which are reciprocated along the packer boxes by the rods 407 through the described operating connections therefor with the eccentric 393.

Followers 419 are mounted in and slidable along the packer boxes 415 and the inner sixteen page signatures 4, 4 are delivered into said packer boxes between said followers and the pushers 418. As inner sixteen page signatures are delivered in succession into the packer boxes 415, the pushers 418 operate after delivery of each signature to push the same along the boxes 415 and to likewise push the progressively increasing packs of signatures and the followers 419 along said boxes for subsequent removal and assembly of the signatures into books as well understood in the art. Secured to the plates 416, 417 and extending through suitable openings therein are spring pressed fingers 420 past which the signatures are pushed by the pushers 418. These fingers serve to hold the signatures in position in the boxes 415 when the pushers move to their inner positions preparatory for action on succeeding signatures.

In accordance with the present invention, the packer boxes 415, the pushers 418, and the rods 407 may be adjusted simultaneously along the rails 408 to various positions and said adjustments may be made without disconnecting the pushers from the described mechanism that reciprocates them along said boxes. Accordingly, the outer ends of the rods 407 are provided therein with pins 421 so that a suitable wrench or the like may be fitted on said ends of the rods in engagement with said pins in order to turn the rods and make the aforesaid adjustments. It will be recalled that the rods 407 are keyed to and slidable in the sleeves 412 and that said rods pass through and have threaded engagement with the blocks 405. It will therefore appear that when the rods 407 are turned, the sleeves 412, which are held against endwise movement, will rotate while, at the same time, the rods will move longitudinally through the blocks 405 with corresponding movement of the pushers 418. Like movement will be imparted by the sleeves 412 to the packer boxes 415 through threaded engagement of said sleeves with the brackets 414 which, together with the brackets 411 and the boxes 415 secured thereto, are slidable along the rails 408. The packer boxes 415, the rods 407, and the pushers 418 will thus, upon rotation of the rods, move longitudinally as a unit along the rails 408 without disturbing the driving connections for said rods with their described operating mechanisms.

The outer, sixteen page signatures 3, 3 fed downwardly by the presser rollers 317, 322 are delivered thereby directly to upper packer boxes and packer mechanism preferably comprised by the following instrumentalities. Fixed on and driven by the shaft 139 is an eccentric 422 (Figs. 2ª and 18) that is provided with and operates a strap 423. This strap 423 is pivotally connected with an arm 424 that is fixed on and rocks the rock shaft 397 through the strap connection for said arm with the eccentric 422. Fixed on and rocked by the shaft 397 is an arm 425 and the arms 424, 425 have pivotally connected therewith corresponding ends of links 426. The opposite ends of links 426 are pivotally connected with arms 427 of bell cranks 428 that are disposed horizontally and have their other arms indicated at 429. The bell cranks 428 are journalled on short vertical stub shafts 430 and are held against vertical displacement thereon by any suitable means for this purpose. The shafts 430 are secured in any suitable manner on the cross member 22 and project upwardly from the top thereof. The bellcranks 430 are thus rocked by the described connections therefor with the arms 424, 425, and the arms 429 of said bell cranks have pivotally connected therewith corresponding ends of links 431. The opposite ends of links 431 are pivotally connected with interiorly threaded blocks 432 and passing through said blocks and having threaded engagement therewith are the threaded portions 433 of rods 434.

The rods 434 extend transversely of the machine and are reciprocated through the described connections for said rods with the bell cranks 428. Rods 434 are slidably and rotatably mounted in suitable bearings in brackets 435 and exteriorly threaded sleeves 436 (Figs. 18, 19 and 20.) Sleeves 436 are journalled in suitable bearings in brackets 437 and endwise displacement of said sleeves relative to brackets 437 and rods 434 is prevented by any suitable means for this purpose. Rods 434 are keyed to and slidable in sleeves 436 and said sleeves have threaded engagement with and extend through suitable threaded openings formed in brackets 438. The brackets 435 and 438 are mounted on and slidable along the rails 378 (Figs. 1ª and 2ª) and the bracket 437 is bolted or otherwise suitably secured to said rails and thereby held against endwise displacement relative thereto.

Upper packer boxes 439 are comprised by flat plates 440 and V-shaped plates 441 disposed in spaced relation at opposite sides of and above rods 434. Plates 440 and 441 are bolted or otherwise suitably secured on the brackets 435 and 438. Secured rotatably to the inner ends of rods 434 and projecting upwardly through the spaces between plates 440, 441 are signature pushers 442 disposed within the packer boxes 439 and reciprocated therealong by the rods 434. Followers 443 are disposed within and slidable along the packer boxes 439 and the outer, sixteen page signatures 3, 3 fed downwardly by presser rollers 317, 322 are delivered thereby directly into the packer boxes 439 between the pushers 442 and the followers 443.

Outer, sixteen page signatures, delivered successively into the packer boxes 439 are pushed successively therealong by the pushers 442 with corresponding movement of the followers 443. Progressively increasing packs of signatures are thus formed which may be removed from boxes 439 for assembling into books as well understood in the art. Secured in any suitable manner on the plates 440, 441 and projecting through suitable openings therein into the packer boxes 439 are spring pressed fingers 444. The signatures delivered into boxes 439 are pushed successively by the pushers 442 past the fingers 444 and said fingers serve to support the delivered and pushed signatures and prevent them from falling and thereby interfering with the delivery of successive signatures into boxes 439 and pushing of the same therealong by pushers 442.

The packer boxes 439, the rods 434 and the pushers 442 are, in accordance with the present invention movable along the rail 378 to various positions and without disconnecting said rods from the described operating mechanisms therefor. Accordingly, the rods 434 are provided in their outer ends with pins 445 which when engaged by a suitable wrench placed on said ends of the rods enable the rods to be turned by the wrench to produce the aforesaid adjustments. Turning movement of rods 434 rotates sleeves 436 and moves the rods along the sleeves and through the blocks 432 through the threaded engagement of said rods with said blocks. Pushers 442, being rotatably secured to rods 434 are likewise moved therewith. Rotation of sleeves 436 likewise moves the brackets 435, 438 and the packer boxes 439 along rails 378 with the rods 434 and the pushers 442 through the threaded engagement of said sleeves with the fixed brackets 437.

Thus far the description of the machine has been with particular reference to production thereby, from each sheet fed thereto, of sixteen page signatures the innermost of which are delivered into the packer boxes 415 and the outermost of which are delivered into the packer boxes 439. In accordance with the present invention each sheet fed into the machine may be formed into four sixteen page signatures two of which are folded with and inserted into the other two to produce from each said sheet two thirty-two page signatures. The mechanism employed for this purpose, in addition to that already described, is preferably operated and comprised by the following instrumentalities.

Fixed on and driven by the folding rollers 360 of the inner carriages 265 are gears 446 (Fig. 6) which mesh with and drive gears 447 that are fixed on and drive shafts 448. The shafts 448 are journalled in suitable bearings secured to or formed integrally with stop and guide plates 449 and depending downwardly therefrom. The stops and guide plates 449 extend transversely of and at right angles to the tapes 275 and have rear grooved guide edges 450. The stop and guide plates 449 are bolted or otherwise suitably secured on the forward brackets 281 that support the plates 282 over which the tapes 275 travel. The shafts 448 and their bearings on the under sides of the stop and guide plates 449 extend diagonally of said stop and guide plates and outwardly in opposite directions toward the outer carriages 226. The gears 446 have meshing with and driven thereby idler gears 451 (Fig. 6) which, in turn, mesh with and drive idler gears 452. The idler gears 451, 452 are journalled in any suitable manner on the stop and guide plates 449 at the fronts thereof. The idler gears 452 mesh with and drive gears 453 which are fixed on and drive shafts 454. The shafts 454 are parallel with the shafts 448 and are journalled in suitable bearings secured to or formed integrally with the stop and guide plates 449 and depending downwardly therefrom. The shafts 454 and their bearings on the under sides of the stop and guide plates 449 also extend diagonally of said stop and guide plates and outwardly in opposite directions toward the outer carriages 226. The shafts 448 and 454 have fixed thereon, driven thereby, and extending diagonally of the stop and guide plates 449 in opposite directions, lower conical untimed or continuously driven conveying rollers 455 disposed rearwardly of the stop and guide plates 449 and extending slightly above and in front of forward portions of the plates 282. The conical rollers 455 on the right hand carriage 265 (Fig. 5) are driven clockwise and the rollers 455 on the left hand carriage are driven counterclockwise through the described driving connections for shafts 448, 454 with the folding rollers 360.

Figure 12:
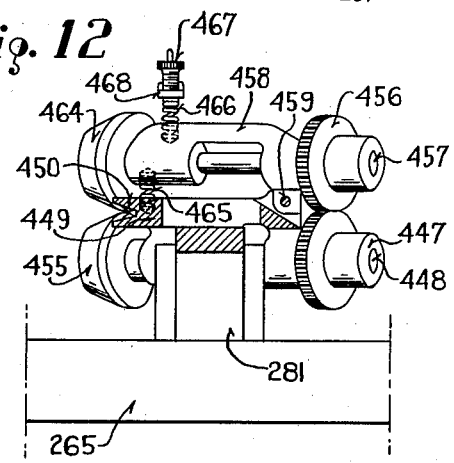
Fig. 12 is a side elevation of the conveying rollers shown in Figs. 10 and 11.

Meshing with and driven by the gears 447 are gears 456 (Fig. 6) which are fixed on and drive shafts 457 disposed above and in parallel relation with the shafts 448. The shafts 457 extend diagonally of the stop and guide plates 449 and outwardly in opposite directions toward the outer carriages 226. Shafts 457 are mounted in suitable similarly extending bearings provided in arms 458 pivoted, as at 459, on the stop and guide plates 449 at the tops and fronts thereof (Fig. 12). The gears 453 mesh with and drive gears 460 (Fig. 6) which are fixed on and drive shafts 461 parallel with the shafts 457 and also extending diagonally of the stop and guide plates 449 and outwardly in opposite directions toward the outer carriages 226. The shafts 461 are journalled in suitable similarly extending bearings in arms 462 which are pivoted, as at 463, on the stop and guide plates 449 at the tops and fronts thereof. The shafts 457, 461 have fixed thereon, driven thereby and extending diagonally of the stop and guide plates 449 in opposite directions, upper conical untimed or continuously driven conveying rollers 464, the rollers 464 on the right hand carriage 265 (Fig. 5) being driven counterclockwise and the rollers 464 on the left hand carriage 265 being driven clockwise by the described driving connections for said rollers with the gears 447, 453.

The rollers 464 cooperate with the rollers 455 and are yieldable and adjustable relative thereto. For this purpose, springs 465 (Fig. 12) are interposed between the stop and guide plates 449 and the arms 458, 462, and springs 466 are interposed between said arms and adjusting screws 467 thereabove. The adjusting screws 467 are threaded through plates 468 (Fig. 11) and bear against the upper ends of springs 466. The plates 468 are secured in any suitable manner on pins 469 which, in turn, are secured in any suitable manner on the stop and guide plates 449. The depth of the teeth of the meshing gears 447, 456 and 453, 460 provides for upward swinging movement of arms 458, 462 without binding of said gears when the twice folded inner sheet sections 2, 2 are fed forward into the bites of rollers 455, 464 and the rollers 464 and the arms 458, 462 are thereby raised.

In the production of thirty-two page signatures, the stops or gage fingers 283 are removed from the machine by unscrewing the forward locking nuts 286 and displacing the rods 284 from the brackets 285. The folding knives 370 are also disconnected from their operating mechanism and are locked in upper, inoperative positions. For this purpose, the taper pins 364 are removed from the arms 365, thereby disconnecting said arms from shaft 341 and preventing operation of the arms and the yokes 366 by said shaft. The slides 369 are then raised to the dotted line positions thereof shown in Fig. 6 to bring openings 470 in said slides into alinement with threaded openings 471 in brackets 285. Thereupon the threaded taper pins are inserted in said openings, as shown in dotted lines in Fig. 6, and turned to engage the threads of said pins with the threads of openings 471. The folding knives 370 are thus held up and locked in inoperative positions by the taper pins 364 and will not act on the inner, twice folded sheet sections 2, 2 delivered forwardly on the plates 282 by the tapes 275.

The registering or heading up devices 309 are then swung upwardly into inoperative positions about their sleeves 310 and locked thereon in said positions. This is accomplished by unscrewing the adjacent nuts 311, swinging the devices 309 up, and then tightening said nuts to lock the devices in their upper, inoperative positions as aforesaid.

The knives 370 having been raised and locked in their upper inoperative positions aforesaid, the inner, twice folded sheet sections 2, 2 will therefore be moved forward by tapes 275 between the conical lower and upper driven rollers 455, 464 and into engagement with the stops and guide plates 449 in the grooves 450 thereof.

The rollers 455, 464 then feed and convey the inner twice folded signatures transversely of the machine in opposite directions along the stops and guide plates 449 on to the plates 247 of the outer carriages 226. The oppositely and transversely fed twice folded sheet sections 2, 2 are then further fed and conveyed transversely of the machine in opposite directions by mechanism which is preferably operated and comprised by the following instrumentalities.

The folding rollers 326 have fixed on and driven thereby gears 472 which mesh with and drive gears 473 that are fixed on and drive shafts 474. The shafts 474 are journalled in suitable bearings secured to or formed integrally with stop and guide plates 475 and depending therefrom. The stop and guide plates 475 extend transversely of and at right angles to the tapes 239 in alinement with the stop and guide plates 449 and said stop and guide plates 475 have rear grooved guide edges 476 and are bolted or otherwise suitably secured on the forward brackets 246 that support the plates 247 below the plates 249 over which the tapes 239 travel. The shafts 474 and their bearings on the under sides of the stop and guide plates 475 extend diagonally of said stop and guide plates and outwardly in opposite directions toward the frames 6 and 8 of the machine. The gears 472 mesh with and drive idler gears 477 which, in turn, mesh with and drive idler gears 478. The idler gears 477, 478 are journalled in any suitable manner on the stop and guide plates 475 at the fronts thereof.

Idler gears 478 mesh with and drive gears 479 which are fixed on and drive shafts 480 which are parallel with the shafts 474. The shafts 480 are journalled in suitable bearings secured to or formed integrally with the stop and guide plates 475 and depending downwardly therefrom. The shafts 480 and their bearings on the under sides of the stop and guide plates 475 also extend diagonally of said stop and guide plates and outwardly in opposite directions toward the frames 6 and 8 of the machine. Fixed on and driven by the shafts 474, 480 and extending diagonally of the stop and guide plates 475 in opposite directions, are lower conical untimed or continuously driven conveying rollers 481. The conical rollers 481 on the right hand carriage 226 (Fig. 5) are driven clockwise and the conical rollers 481 on the left hand carriage 226 are driven counterclockwise through the described driving connections for shafts 474, 480 with the folding rollers 326.

The gears 473 mesh with and drive gears 482 (Fig. 6) which are fixed on and drive shafts 483 disposed above shafts 474 in parallel relation therewith. The shafts 483 extend diagonally of the stop and guide plates 475 and outwardly in opposite directions toward the frames 6 and 8 of the machine. Shafts 483 are journalled in suitable similarly extending bearings on arms 484

(Fig. 9) pivoted, as at 485, on the stop and guide plates 475 at the tops and fronts thereof.

The gears 479 mesh with and drive gears 486 (Fig. 6) which are fixed on and drive shafts 487 disposed above the shafts 480 in spaced parallel relation with the latter and the shafts 483. The shafts 487 also extend diagonally of the stop and guide plates 475 and outwardly in opposite directions toward the frames 6 and 8 of the machine. Shafts 487 are journalled in suitable similarly extending bearings on arms 488 pivoted, as at 489, on the stop and guide plates 475. Fixed on and driven by the shafts 483, 487 and extending diagonally of the stop and guide plates 475 in opposite directions are upper conical untimed and continuously driven conveying rollers 490 which cooperate with the lower, conical conveying rollers 481. The rollers 490 of the right hand carriage 226 are driven counterclockwise and the rollers 490 of the left hand carriage 226 are driven clockwise by the described driving connections for said rollers with the gears 473, 479.

The depth of the teeth of the gears 473, 482 and 479, 486 provides for upward swinging movement of arms 484, 488 without binding of said gears when the twice folded inner sheet sections 2, 2 are fed laterally by the rollers 455, 464 between the rollers 481, 490 and the arms 484, 488 and rollers 490 are thereby raised. The pivotal mounting of arms 484, 488 also provides for relative yielding movement of rollers 481, 490 and relative adjustment therebetween. For these purposes, small springs 491 are interposed between plates 475 and arms 484, 488 and small springs 492 are interposed between said arms and adjusting screws 493. The adjusting screws 493 are threaded through plates 494 and bear against the upper ends of springs 492. The plates 494 are secured in any suitable manner on vertical pins 495 which, in turn, are secured in any suitable manner on the stop and guide plates 475.

In the production of thirty-two page signatures the inner, twice folded sheet sections 2, 2 are fed by the rollers 455, 464 transversely of the machine in opposite directions along the stop and guide plates 449 in the grooves 450 thereof and onto the plates 247 of the outer carriages 226. The inner, twice folded sheet sections when delivered onto the plates 247 are received between the rollers 481, 490 and fed thereby in opposite directions transversely of the machine along the stop and guide plates 475 in the grooves 476 thereof and into contact with side stops or gages 496 which stop the sheet sections 2, 2 directly below the outer, twice folded sheet sections 1, 1 that have been fed by the tapes 239 forwardly along the plates 249 into contact with the front stop or gage fingers 250 and headed up by the heading up devices 308.

Due to the diagonal arrangement of the rollers 455, 464 and 481, 490 a forward impulse is imparted thereby to the inner, twice folded sheet sections 2, 2 thereby continuously holding them against the stop and guide plates 449, 475, in the grooves 450, 476 thereof while said sheet sections are being fed therealong by said rollers to the side stops or gages 496.

In this transverse feeding of the inner, twice folded sheet sections 2, 2 in opposite directions cut edges of said sheet sections become leading edges which engage the side stops or gages 496 and insure that the subsequent folding of sheet sections 2, 2 hereinafter described, will be square with the printing on said sheet sections.

The side stops or gages 496 are secured in any suitable manner on the outer edge portions of the plates 247 for adjustment laterally of the machine to stop the transversely fed, twice folded inner sheet sections 2, 2 in proper position for the aforesaid further folding thereof. When the inner, twice folded sheet sections 2, 2 engage the side stops or gages 496 the conical rollers 490 are raised out of contact with said sections by mechanism operated through descent of the folding knives 348 and which is preferably mounted and constructed as follows.

Figure 9:
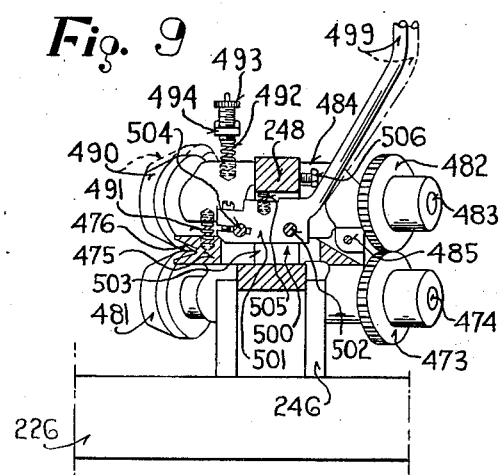
Fig. 9 is a side elevation of the conveying rollers shown in Figs. 7 and 8.

Bolted or otherwise suitably secured on the folding knives 348 are cams 497 which, upon descent of said knives, engage cams 498 that are fixed on the upper ends of the arms 499 of bell cranks 500 (Figs. 7, 8 and 9). The other arms of bell cranks 500 are indicated at 501 and said bell cranks are pivoted at 502 on the forward blocks 248 in slots or grooves 503 formed therein. The arms 501 of the bell cranks 500 have secured therein in any suitable manner pins 504 which extend transversely of the machine under the rear end portions of the pivoted arms 484, 488 that carry the rollers 490. Interposed between the bell crank arms 501 and the blocks 248 upon which they are mounted are springs 505. The springs 505 normally tend to swing the bell crank arms 501 downwardly and hold the bell crank arms 499 in engagement with limit screws 506 which insure that the cams 498 will be directly disposed below the cams 497 when the knives 348 descend.

The limit screws 506 are threaded in suitable threaded openings formed in the blocks 248 and when the knives 348 descend and the cams 497 engage the cams 498 the bell cranks 500 will be swung to raise their arms 501 against the action of the springs 505. Raising of the bell crank arms 501 raises the pins 504 and the arms 484, 488 with which said pins are engaged. Raising of the arms 484, 488 is effected against the action of the springs 492 and raises the rollers 490 out of engagement with the inner, twice folded sheet sections 2, 2 supported on the plates 247 in engagement with the side stops or gages 496. Raising of the rollers 490 stops further feeding action thereof on the inner, twice folded sheet sections and prevents crowding of the same against the side stops or gages 496.

The folding knives 348, during continued descent thereof, tuck the outer, twice folded sheet sections 1, 1 on plates 249 and the inner twice folded sheet sections 2, 2 on plates 247 downwardly through the slots 330 and 331 into the bites of the folding rollers 326, 328. The outer, twice folded sheet sections 1, 1 are thus inserted in the inner, twice folded sheet sections 2, 2 and both of the same are simultaneously folded by the folding rollers 326, 328 and delivered thereby with folded edges downward into the bites of the presser rollers 317, 322. The thirty-two page signatures thus produced are then delivered one at each side of the machine by the presser rollers 317, 322 directly into the upper packer boxes 439 where they are packed by the pushers 442 with other thirty-two page signatures in the manner described above in connection with the outer sixteen page signatures 3, 3.

Upon raising of the knives 348 the cams 497 are disengaged from the cams 498 and the springs 505 act to return the bell cranks 500 to their original positions in which the bell crank arms 499 engage the limit screws 506. At the same time, the pivoted arms 484, 488 swing downwardly through the action of the springs 492 and the rollers 490 are lowered and brought into cooperative relation with the rollers 481.

The operation of the machine will be fully understood from the foregoing description and may be briefly summarized as follows, first with reference to the production of four sixteen page signatures simultaneously during each cycle of operation of the machine, and second with reference to the production of two thirty-two page signatures simultaneously during each cycle of operation of the machine. In the production of the sixteen page signatures, the sheet A (Fig. 21) fed into the machine is carried forwardly therein by the tapes 43 and the tapes 91 (Figs. 2 and 2ª) until the leading edge of the sheet engages the sheet stops or gages 97. Thereupon the folding knife 110 descends and the sheet is tucked thereby between plates 83, 84 and rollers 80, 82 and a first fold B (Fig. 21) is thus made in the sheet transversely thereof. The rollers 80, 82 deliver the once folded sheet, with its folded edge leading, downwardly between rollers 75 and tapes 121 and the latter carry the sheet forwardly until its leading, folded edge strikes the stop or gage fingers 133 which, at this time, have moved to their rearmost position. The perforator head 173 then descends and the perforator blades 174 make a line of perforations C across the sheet where a second fold is to be made therein parallel with the first fold. The perforator head 173 then rises, the grippers 176 engage the leading folding edge of the sheet and the sheet is moved forwardly by the grippers with the stop or gage fingers 133 which at this time travel to the limit of their forward movement. At said limit, the line of perforations C across the sheet is disposed directly below the knife 194. The grippers 176 are now released from the sheet and it is side registered by the mechanism for this purpose (not shown). The knife 194 then descends onto the sheet along the line of perforations formed therein and tucks the sheet downwardly through the slot in plate 129 and between the folding rollers 180, 183. The sheet thus has the second fold D made therein along the line of perforations and parallel with the first fold B and the twice folded sheet, with the folded edge downward, is delivered by the folding rollers 180, 183 between the feed rollers 201, 204 and the cutters 205 and their associated spaced metal rollers (not shown) between which said cutters operate. The feed rollers 201, 204 feed the twice folded sheet downwardly during which time the cutters 205 cut the sheet into four twice folded sections.

The outer, twice folded sheet sections 1, 1 are delivered by certain of the rollers 201, 204 between the rollers 236 and tapes 239 and the inner twice folded sheet sections 2, 2 are delivered by certain other rollers 201, 204 between rollers 272 and tapes 275. The tapes 239 and the tapes 275 carry the outer and inner twice folded sections forwardly into engagement with the stop or gage fingers 250 and 283, respectively, whereupon the outer twice folded sheet sections 1, 1 are headed up or registered with respect to the knives 348 by the devices 308 and the inner twice folded sheet sections 2, 2 are headed up or registered with respect to the knives 370 by the devices 309.

The folding knives 348, 370, which have previously been raised, are now lowered, and in conjunction with the folding rollers 326, 328 and 360, 362, simultaneously make third folds E in the four twice folded sheet sections at right angles to the two parallel folds previously made therein. Four sixteen page signatures are thus simultaneously produced which are delivered in like manner between the presser rollers 317, 322 and 352, 357 (Fig. 5).

The presser rollers 317, 322 and 352, 357 simultaneously deliver the four sixteen page signatures from the machine into the packer boxes 439, 415 (Fig. 6) the two outer signatures 3, 3 passing directly from the rollers 317, 322 into boxes 439 and the two inner signatures 4, 4 passing into and through the rollers 389, 388 along the guides 392 and into boxes 415. The four sixteen page signatures are simultaneously packed in the boxes 439 and 415 by the pushers 418 and 442 as previously described whereupon another cycle of operation of the machine proceeds including the above described steps in the order named. It will thus appear that the sheets fed successively into the machine are each formed into sixteen page signatures and that series of these signatures, each including four sixteen page signatures, are delivered successively from the machine during successive cycles of operation thereof.

In the production of thirty-two page signatures, the operation is the same as that described above down to the time the outer and inner twice folded sheet sections 1, 1 and 2, 2 are fed forwardly by the tapes 239 and 275, respectively. In this case, however, the stops or gages 283 are removed from the machine, the registering or heading up devices 309 are swung up and locked in raised inoperative positions, and the folding knives 370 are disconnected from their operating mechanisms and raised and locked in inoperative positions, all as previously described. The outer twice folded sheet sections 1, 1 are therefore fed forwardly by the tapes 239 into engagement with the stops or gages 250 and headed up by the devices 308, and the inner twice folded sheet sections 2, 2 are fed forwardly by the tapes 275 between the conical rollers 455, 464 (Figs. 5, 10 and 12) into engagement with the stop and guide plates 449 in the grooves 450 thereof.

The rollers 455, 464 then feed the inner, twice folded sheet sections 2, 2 transversely of the machine in opposite directions (Fig. 22) along the guides 449 in the grooves 450 thereof onto the plates 247 and into engagement with the conical feed rollers 481, 490. The rollers 481, 490 further feed the twice folded inner sheet sections 2, 2 transversely of the machine in opposite directions on plates 247 along the guides 475 in the grooves 476 until cut leading edges of said sections engage the side stops or gages 496 (Fig. 5). At this time, the folding knives 348, which have previously been raised, begin to descend and the rollers 490 are raised out of engagement with the inner, twice folded sheet sections 2, 2 by the action of cams 497 on the cams 498 and swinging movement of bell cranks 500, as previously described. Upon continued descent of the folding knives 348 they act, in conjunction with the folding rollers 326, 328 to simultaneously fold the outer, twice folded and headed up sheet sections 1, 1 with the positively and transversely fed inner, twice folded sheet sections 2, 2 so that said outer sections are inserted in said inner sections and two thirty-two page signatures 4', 4' with the folds E made therein are simultaneously produced and delivered downwardly by the folding rollers 326, 328. The two thirty-two page signatures 4', 4' are simultaneously received between the two sets of presser rollers 317, 322 (Fig. 5) which simultaneously deliver said signatures directly into the packer boxes 439 (Fig. 6). The thirty-two page signatures are packed in these boxes by the pushers 442, as previously described, and the machine proceeds with its next cycle of operation including the last described steps in the order named.

It will thus appear that when producing thirty-two page signatures each sheet A fed into the machine is twice folded and cut into outer and inner sections 1, 1 and 2, 2 whereupon the inner sections 2, 2 are transversely fed with respect to the outer sections 1, 1 so that they have overlying relationship. Consequently, the inner and outer sections may be, and are, simultaneously folded together at right angles to the previous folds made therein with the resulting simultaneous production of two thirty-two page signatures during each cycle of operation of the machine. The operations performed by the machine on each sheet are performed, in the order named, on each succeeding sheet and it will thus appear that sheets fed successively into the machine are successively formed into series of two thirty-two page signatures that are successively delivered into the packer boxes 439 and there packed as previously described.

Sheets of various sizes may be fed into the machine and thereby operated upon to produce simultaneously from each sheet four sixteen page signatures or two thirty-two page signatures, as above described. The size of the twice folded sheet sections will vary in accordance with the size of the sheets from which they are produced and in order to further fold the twice folded sheet sections adjustment of the carriages 226, 265 transversely of the machine is made in accordance with the particular size of sheet being run through the machine and the particular size of twice folded sheet sections produced. Accordingly, the I-beams 230, 231 have bolted or otherwise suitably secured thereto and extending therealong racks 507 (Figs. 6, 7 and 10) in the teeth of which are meshed gears 508 that are fixed on shafts 509. The shafts 509 extend through horizontal elongated openings 510 formed in I-beam 231 and said shafts are journalled in suitable bearings in brackets 511 bolted or otherwise suitably secured to the carriages 226, 265 and depending downwardly therefrom. The shafts 509 are provided on their forwardly projecting ends with square portions 512 for the reception of the interiorly squared end 513 of an operating handle 514. It will thus appear that the handle 514 may be employed to turn the shafts 509 and thus adjust the carriages 226, 265 along I-beams 230, 231 through motion imparted to said carriages by engagement of the gears 508 with and rotation of the same along the racks 507.

Adjustment of the carriages 226, 265 as aforesaid along the I-beams 230, 231 results in corresponding adjustment of all of the parts on the carriages and without disconnecting the drive for any of the operated parts from the mechanisms for operating them. The tape rollers 223, 236 and the tape rollers 262, 272 are keyed to and slidable along their driving shafts 222, 235 and 261, 271. Accordingly, when the carriages 226, 265 are shifted laterally of the machine said tape rollers and the tapes 239, 275 are likewise shifted by the brackets 225, 238 and 264, 274 which are secured to said carriages and have their upper arcuate ends engaged in the grooves of said rollers.

The bevel gears 314, 349, as will be recalled, are keyed to and slidable along the shaft 29 and when the carriages 226, 265 are shifted laterally the bevel gears 314, 349 will be likewise shifted on the shaft 29 by the brackets 315, 350 which are secured to said carriages and have their arcuate upper ends engaged in the annular grooves of said gears. The bevel gears 314, 349 drive the bevel gears 316, 351 which shift with the carriages 226, 265 and therefore continuously maintain the driving connections for all of the rollers on said carriages with the bevel gears 314, 349. The slides 347, 369, as will be recalled, have openings therein through which extend the rods or bars 346, 368 on the slide operating yokes 344, 366. When the carriages 226, 265 are shifted laterally the slides 347, 369 move likewise along the bars 346, 368 so that the driving connections for the slides 347, 369 and the folding knives 348, 370 on said carriages with the yokes 344, 366 are continuously maintained.

It will thus appear that regardless of lateral shifting movement of the carriages 226, 265 all of the operated parts on each carriage will be connected with the several mechanisms for operating them and that said carriages may be laterally shifted, as desired, without disconnecting said parts from said mechanisms.

The delivery mechanisms on the carriages 377 are, as will be recalled, adjustable laterally therewith along the rails 378 without disconnecting the drive for the rollers 388, 389 with the shaft 374. Likewise, the lower and upper packer boxes 415, 439 and their pushers 418, 442 are adjustable as units along the rails 408, 378 without disconnecting said pushers from their operating mechanisms. Consequently, when the inner and outer carriages 226, 265 and the parts carried thereby are adjusted laterally and the machine is to be employed for production of sixteen page signatures, the delivery mechanisms are likewise adjusted to positions under the presser rollers 352, 357, and the lower and upper packer boxes 415, 439 and their pushers 418, 442 are laterally adjusted to positions where the boxes 415 may receive the signatures from said delivery mechanisms and the boxes 439 may receive the signatures from the presser rollers 317, 322. When the inner and outer carriages 226, 265 and the parts carried thereby are adjusted laterally and the machine is to be employed for the production of thirty-two page signatures, the upper packer boxes 439 and their pushers 442 are likewise adjusted to positions where said upper packer boxes may receive the signatures from the presser rollers 317, 322.

In addition to the aforesaid adjustments, the slides 119, 170, 192 for the folding knife 110, perforator blades 174 and folding knife 194 may, in accordance with the present invention, be adjusted in their guides 120 and 171 to insure direct vertical alinement of knife 110, blades 174 and knife 194 with the bite between folding rollers 80, 82, the slot in die plate 128, and the bite between folding rollers 180, 183, respectively. As shown in Fig. 23, for example, the slide 119 for folding knife 110 is arranged in the guide 120 between antifriction bearings 515 mounted on eccentrics 516. The eccentrics 516 are secured to or formed integrally with pins indicated at 517 in Figs. 1, 1ª, 23 and 24 and said pins are rotatably mounted in suitable openings in the guides 120 and 171. The pins 517 are held against displacement from the guides 120 and 171 by set screws 518 (Fig. 24) and said pins are provided in the outer ends thereof with slots 519.

If the knife 110, for example, is out of alinement with the bite between folding rollers 80, 82 the set screws 518 (Fig. 24) are loosened by a screw driver or other tool which is then employed in the slots 519 of pins 517 to turn said pins and their eccentrics 516 and thus shift the slides 119 to bring the knife 110 in direct vertical alinement with the bite between the folding rollers 80, 82. The set screws 518 are then tightened to hold the pins 517, eccentrics 516 and bearings 515 against displacement and maintain the knife 110 in proper position. Similar adjustments of the perforator blades 174 and the knife 194 may be made by shifting their slides 170 and 192 through the medium of their eccentric and bearing carrying pins 517.

The present invention has been described and illustrated herein with more or less particularity in connection with an embodiment capable of producing signatures of sixteen pages or of thirty-two pages, as desired. It is to be expressly understood, however, that the present invention is not limited to said embodiment or otherwise than by the terms of the appended claims.

What we claim is:

1. In a folding machine, inner and outer knife type folding mechanisms, inner and outer conveyors disposed at different levels respectively for conveying sheet sections to the inner and outer folding mechanisms, heading up or registering devices disposed at said different levels and adapted to move sheet sections on certain of the conveyors inwardly and sheet sections on the other conveyors outwardly into proper positions for folding thereof by said mechanisms, and means for operating said heading up or registering devices and comprising mechanism connected therewith and a single cam for operating said last named mechanism.

2. In a folding machine, inner and outer knife type folding mechanisms, inner conveyors for conveying sheet sections to the inner folding mechanisms, outer conveyors for conveying sheet sections to the outer folding mechanisms and disposed at levels higher than the inner conveyors, lower and upper heading up or registering devices adjacent the inner and outer conveyors respectively and adapted to move sheet sections on the inner conveyors inwardly and sheet sections on the outer conveyors outwardly into proper positions for folding thereof by said mechanisms, and means for operating said lower and upper heading up or registering devices and comprising mechanism connected therewith and a single cam for operating said last named mechanism.

3. In a folding machine, inner and outer knife type folding mechanisms, inner and outer conveyors disposed at different levels respectively for conveying cut sheet sections to the inner and outer folding mechanisms, heading up or registering devices disposed at said different levels between the inner and outer folding mechanisms and adapted to engage cut edges of the sheet sections and move those on certain of the conveyors inwardly and those on the other conveyors outwardly into proper positions for folding thereof by said mechanisms, and means for operating said heading up or registering devices and comprising mechanism connected therewith and a single cam for operating said last named mechanism.

4. In a folding machine, inner and outer knife type folding mechanisms, inner and outer conveyors disposed at different levels respectively for conveying cut sheet sections to the inner and outer folding mechanisms, heading up or registering devices disposed between the inner and outer folding mechanisms and adapted to engage outer cut edges of sheet sections on the inner conveyors and move them inwardly into proper positions for folding thereof by the inner folding mechanisms, heading up or registering devices disposed between the inner and outer folding mechanisms and adapted to engage inner cut edges of sheet sections on the outer conveyors and move them outwardly into proper positions for folding thereof by the outer folding mechanisms, and means for operating said heading up or registering devices and comprising mechanism connected therewith and a single cam for operating said last named mechanism.

5. In a folding machine, inner and outer folding mechanisms, a pair of rods extending transversely thereof in spaced parallel relation and provided with opposed racks, inner and outer conveyors arranged at different levels respectively for conveying sheet sections to the inner and outer folding mechanisms, heading up or registering devices disposed at said levels between the inner and outer folding mechanisms and secured on said rods, said heading up or registering devices being adapted to move sheet sections on certain of the conveyors inwardly and sheet sections on the other conveyors outwardly into proper positions for folding thereof by said folding mechanisms, a gear interposed between said rods and engaging said racks, and means for rotating said gear in opposite directions to reciprocate said rods and operate said heading up or registering devices.

6. In a folding machine, a plurality of transversely spaced knife type folding mechanisms for folding sheet sections delivered thereto on different levels, a shaft extending transversely of the folding mechanisms, heading up or registering devices mounted on said shaft and disposed at said levels for moving some of the sheet sections transversely in one direction into proper folding positions, a second shaft extending transversely of the folding mechanisms, heading up or registering devices mounted on said second shaft and disposed at said levels for moving other of the sheet sections transversely in the opposite direction into proper folding positions, and means for reciprocating said shafts in opposite directions to operate said heading up or registering devices.

7. In a folding machine, means for feeding sheet sections in parallel paths and on different levels, folding means in said paths for separately folding the sections fed on said levels, means acting on the side edges of the sheet sections and adapted to move those on different levels in opposite directions transversely of said paths and into proper positions for folding thereof by said folding means, and a single cam operated rack and gear mechanism for operating said last named means.

8. In a folding machine, means for feeding sheet sections in parallel paths and on different levels, knife type folding mechanisms extending longitudinally of said paths for separately folding the sections fed on said levels, and rack and gear operated means acting on side edges of the sheet sections and adapted to move some of the sections in one direction and others in the opposite direction transversely of said paths into proper positions for folding by said mechanisms.

9. In a folding machine, a plurality of knife type folding mechanisms adjustable transversely of the machine, a plurality of endless conveyors having separate pairs of rear driven rollers therefor and likewise adjustable for delivering sheet sections to the folding mechanisms to be folded thereby, means for operating the folding mechanisms and driving the rear driven rollers and the conveyors, means connecting the operating and driving means with the folding mechanisms and the rear driven rollers of the conveyors and providing for transverse adjustments of the folding mechanisms, the pairs of rear driven rollers and the conveyors without disconnection of the same from their operating and driving means, and means for simultaneously adjusting any one of said folding mechanisms and its conveyor and separate pair of rear driven rollers therefor transversely of said machine.

10. In a folding machine, a plurality of carriages adjustable transversely thereof, a plurality of endless conveyors having separate pairs of rear driven rollers therefor and likewise adjustable transversely of the machine, folding mechanisms on the carriages including inter-geared folding rollers above which sheet sections are delivered by the conveyors for folding by said folding mechanisms, means for driving the pairs of rear driven rollers, the conveyors and the intergeared folding rollers, means connecting the driving means with the pairs of rear driven rollers of the conveyors and the intergeared rollers of the folding mechanisms and providing for transverse adjustments of the carriages, the rear driven rollers, the conveyors and the intergeared folding rollers without disconnection of said rear driven rollers, said conveyors and said intergeared folding rollers from said driving means, and means for simultaneously adjusting any one of the carriages, its pair of rear driven rollers, its conveyor and its intergeared folding rollers transversely of said machine.

11. In a folding machine, a plurality of carriages adjustable transversely thereof, a plurality of conveyors likewise adjustable, folding mechanisms on the carriages including vertically reciprocating slides having bar receiving openings therein and folding knives secured on said slides, means for driving the conveying means, mechanism for operating the slides and the knives, connections between the driving means and the conveyors providing for transverse adjustment of the latter without disconnection of the same from said driving means, bars on the slide operating mechanism extending through the openings in the slides and providing for transverse adjustment of the latter and the knives without disconnection thereof from said operating mechanism, and means for simultaneously adjusting any one of said carriages, its conveyor, its slide and its knife transversely of said machine.

12. In a folding machine, a plurality of carriages adjustable transversely thereof, intergeared folding rollers and diagonally arranged conveying rollers on the carriages and likewise adjustable transversely of the machine, means for driving the folding and conveying rollers, connections between one folding roller of each carriage and the driving means and providing for transverse adjustments of the intergeared folding and diagonally arranged conveying rollers without disconnection of the same from said driving means, and means for simultaneously adjusting any one of said carriages and its intergeared folding and diagonally arranged conveying rollers transversely of said machine.

13. In a folding machine, a plurality of carriages adjustable transversely thereof, intergeared folding rollers, presser rollers and diagonally arranged conveying rollers mounted on the carriages and likewise adjustable transversely of the machine, means for driving the intergeared folding, presser and conveying rollers, connections between a folding roller of each carriage and the driving means and providing for transverse adjustments of the intergeared folding, presser and diagonally arranged conveying rollers without disconnection of the same from said driving means, and means for simultaneously adjusting any one of the carriages and its intergeared folding, presser and diagonally arranged conveying rollers transversely of said machine.

14. In a folding machine, a plurality of carriages adjustable transversely thereof, folding mechanisms on the carriages likewise adjustable and including vertically reciprocating slides having openings therein and folding knives secured on said slides, mechanism for operating the slides and knives, bars on the operating mechanism extending through the openings in the slides and providing for transverse adjustment of the latter and the knives without disconnection thereof from said operating mechanism, and means for simultaneously adjusting any one of said carriages, its slide and the knife thereon transversely of said machine.

15. In a folding machine of the type having a plurality of mechanisms for folding sheet sections into signatures and a plurality of aligned angularly arranged packer boxes disposed downwardly and forwardly of the folding mechanisms and into which the signatures are delivered, the combination of a plurality of mechanisms for delivering the signatures into the packer boxes and each comprising pairs of opposed driven conical rollers disposed in spaced opposed inclined relation one pair below another and between which the signatures are received from said folding mechanisms, and means for driving the opposed inclined conical rollers of each of said pairs in opposite directions whereby they maintain the signatures under positive control and positively feed them downwardly and forwardly at an angle into said packer boxes.

16. In a folding machine of the type having a plurality of mechanisms for folding sheet sections into signatures and adjustable transversely of the machine and a plurality of aligned angularly arranged downwardly and forwardly disposed packer boxes likewise adjustable and into which the signatures are delivered, the combination of a plurality of mechanisms adjustable transversely of the machine for delivering the signatures into the packer boxes and each comprising pairs of driven conical rollers disposed in spaced opposed inclined relation one pair below another and between which the signatures are received from said folding mechanisms, and means for driving the opposed inclined conical rollers of each of said pairs in opposite directions whereby they maintain the signatures under positive control and positively feed them downwardly and forwardly at an angle into said packer boxes.

17. In a folding machine of the type having a plurality of mechanisms for folding sheet sections into signatures and adjustable transversely of the machine and a plurality of aligned angularly arranged downwardly and forwardly disposed packer boxes likewise adjustable and into which the signatures are delivered, the combination of a plurality of mechanisms adjustable transversely of the machine for delivering the signatures into the packer boxes and each comprising pairs of driven conical rollers disposed in spaced opposed inclined relation one pair below another and between which the signatures are received from said folding mechanisms, means for driving the opposed inclined conical rollers of each of said pairs in opposite directions whereby they maintain the signatures under positive control and positively feed them downwardly and forwardly at an angle into said packer boxes, and driving connections for the opposed inclined conical rollers with the driving means providing for transverse adjustments of said signature delivering mechanisms and their opposed inclined conical rollers without disconnection of said rollers from said driving means.

18. In a folding machine of the class having a knife type folding mechanism and a forwardly and downwardly disposed angularly arranged packer box in which the folded signatures delivered from said folding mechanism are packed, the combination of a carriage, a forwardly and downwardly inclined guide on the carriage for receiving the signatures from the folding mechanism, and a plurality of oppositely driven opposed conical rollers disposed one below another on opposite sides of the guide and inclined upwardly and outwardly away from each other for feeding the folded signatures on edge forwardly and downwardly along the guide and into said packer box.

19. In a folding machine of the class having a knife type folding mechanism and a forwardly and downwardly disposed angularly arranged packer box in which the folded signatures delivered from said folding mechanism are packed, the combination of a carriage, a downwardly and forwardly inclined guide on the carriage for receiving the signatures from the folding mechanism, a plurality of opposed oppositely driven conical rollers disposed one below another on opposite sides of the guide and inclined outwardly away from each other for feeding the folded signatures on edge downwardly and forwardly along the guide and into said packer box, and means for varying the inclination of said rollers with respect to each other to vary the space therebetween.

20. In a folding machine of the type having inner and outer folding mechanisms for folding sheet sections into signatures, upper and outer packer boxes into which signatures are delivered directly from the outer folding mechanisms, and lower and inner aligned forwardly disposed angularly arranged packer boxes, the combination of two series of pairs of spaced opposed inclined driven conical rollers disposed one pair below another for receiving the signatures from the inner folding mechanisms and delivering said last named signatures to said lower and inner packer boxes, and means for driving the opposed inclined conical rollers of each of said pairs in opposite directions whereby they maintain the signatures under positive control and positively feed them downwardly and forwardly at an angle into the lower and inner packer boxes.

21. In a folding machine, inner and outer laterally adjustable mechanisms for folding sheet sections into signatures, inner and outer laterally adjustable packer boxes and reciprocating pushers for receiving and packing said signatures, rods for the pushers rotatably connected therewith to adjust the same, means for reciprocating the pushers and their rods, and means connecting the pusher rods with said first named means and the packer boxes and adapted to laterally adjust said pushers and said boxes upon rotation of said rods.

22. In a folding machine, a packer box and a reciprocating pusher therein for receiving and packing signatures, a reciprocated rod for operating the pusher rotatably connected therewith to adjust the same, mechanism for reciprocating the rod and the pusher, and means connecting the pusher rod and said mechanism and adapted to adjust said pusher upon rotation of said rod.

23. In a folding machine, a packer box in which the folded signatures are packed, a reciprocating pusher in the packer box for packing the folded signatures one after another along the same, a reciprocated rod for the pusher acting to operate said pusher and rotatably connected therewith to adjust the packer box, and means connecting the pusher rod with the packer box for adjusting said box upon rotation of said rod.

24. In a folding machine, a packer box in which the folded signatures are packed, a pusher extending in the packer box and reciprocated therein for packing the folded signatures one after another along the box, a rod for the pusher rotatably connected therewith to adjust the same, means for operating the rod and said pusher, and means connecting the pusher rod with said first named means and the packer box and adapted to adjust said packer box and the pusher as a unit to different operative positions upon rotation of said pusher rod.

25. In a folding machine, a packer box in which the folded signatures are packed, rails for slidably supporting the packer box, a pusher extending in the packer box and reciprocated therein for packing the folded signatures one after another along the box, means for operating said pusher and provided with a threaded block, a longitudinally extending slidably and rotatably arranged rod for the pusher rotatably connected with said pusher to adjust the same and having threaded engagement with said block, said rod being reciprocated by said means to operate the pusher, and a sleeve on the pusher rod slidably connected therewith, held against longitudinal movement therealong, and having threaded engagement with the packer box, rotation of the pusher rod causing rotation of said sleeve and movement of the packer box along the rails with corresponding movement of said pusher rod and said pusher.

26. In a folding machine, means for making one or more folds in the sheet transversely thereof; timed means for feeding the sheet to said folding means; mechanism for receiving the folded sheet from the folding means and for cutting said folded sheet into a plurality of folded sheet sections; means for advancing the sheet sections in parallel paths; side registering means and front registering means; untimed means for conveying a sheet section in one of said paths transversely therefrom along and in engagement with said front registering means toward a second sheet section in another of said paths and into position against said side registering means such that one sheet section overlies the other sheet section and is in accurate alignment therewith; and timed knife type folding means for simultaneously folding the over and underlying sheet sections at right angles to the folds previously made therein and for inserting one of said sections within the other.

27. In a folding machine, means for making one or more folds in the sheet transversely thereof; timed means for feeding the sheet to said folding means; mechanism for receiving the folded sheet from the folding means and for cutting said folded sheet into a plurality of folded sheet sections; means for advancing the sheet sections in parallel paths; side registering means and front registering means; untimed means for conveying sheet sections in certain of said paths transversely therefrom along and in engagement with said front registering means toward sheet sections in other of said paths and into positions against said side registering means such that certain of the sheet sections overlie other sheet sections and are in accurate alignment therewith; and a plurality of timed knife type folding means for simultaneously folding the over and underlying sheet sections at right angles to the folds previously made therein and for inserting said sheet sections one with another.

28. In a folding machine, means for making one or more folds in the sheet transversely thereof; timed means for feeding the sheet to said folding means; mechanism for receiving the folded sheet from the folding means and for cutting said folded sheet into a plurality of inner and outer sheet sections; means for advancing the inner and outer sheet sections in parallel inner and outer paths; side registering means and front registering means; untimed means for conveying the sheet sections in the inner paths transversely therefrom in opposite directions along and in engagement with said front registering means toward the outer sheet sections and into positions against said side registering means such that certain of the sheet sections overlie other sheet sections and are in accurate alignment therewith; and a plurality of timed knife type folding means for simultaneously folding the over and underlying sheet sections at right angles to the folds previously made therein and for inserting said sheet sections one within another.

29. In a folding machine, means for making one or more folds in a sheet transversely thereof, timed means for feeding the sheet to said folding means, means for cutting the folded sheet into sections, means for advancing the folded sheet sections in parallel paths, side registering means and front registering means, untimed means for conveying a sheet section in one of said paths transversely therefrom along and in engagement with said front registering means toward a section in another of said paths and into position against said side registering means such that one of said sections overlies the other and is in accurate alignment therewith, and timed knife type means for folding the over and underlying sheet sections simultaneously and for inserting one of them within the other.

30. In a folding machine, timed knife type means for folding a sheet, means for cutting the folded sheet into sections, means for advancing said sections in parallel paths, side registering means and front registering means; untimed means for conveying a sheet section in one of said paths transversely therefrom along and in engagement with said front registering means toward a sheet section in another of said paths and into position against said side registering means such that one of the sections overlies the other section and is in accurate alignment therewith, and timed means for folding the over and underlying sheet sections simultaneously and for inserting one section within the other.

31. In a folding machine, timed knife type means for folding a sheet, means for cutting the folded sheet into a plurality of sections, means for advancing said sections in parallel paths, side registering means and front registering means, untimed means for conveying a section in one of said paths transversely therefrom along said front registering means toward a section in another of said paths and into position against said side registering means such that one of the sections overlies the other section and is in accurate alignment therewith, and timed knife type means for simultaneously folding the over and underlying sheet sections at right angles to the folds previously made therein and for inserting one section within the other.

32. In a folding machine, timed knife type means for folding a sheet, means for cutting the folded sheet into a plurality of inner and outer sections, means for advancing said inner and outer sections in parallel paths, side registering means and front registering means, untimed means for conveying the inner sections transversely in opposite directions along and in engagement with said front registering means toward the outer sections and into positions against said side registering means such that the outer sections overlie the inner sections and are in accurate alignment therewith, and a plurality of timed knife type means for simultaneously folding the over and underlying outer and inner sheet sections at right angles to the folds previously made therein and for inserting the outer sections within the inner sections.

33. In a folding machine, means for making one or more folds in a sheet transversely thereof, timed means for feeding the sheet to said folding means, means for cutting the folded sheet into sections, means for advancing said sections in parallel paths, side registering means and front registering means, means for conveying a section in one of said paths transversely therefrom along and in engagement with said front registering means toward a second section in another of said paths and into position against said side registering means such that one of said sections overlies the other section and is in accurate alignment therewith, said conveying means comprising untimed opposed elements relatively displaceable by the sheet sections acted upon, and timed means for folding the over and underlying sections simultaneously at right angles to the folds previously made therein and for inserting one section within the other.

34. In a folding machine, timed knife type means for folding a sheet, means for cutting the folded sheet into a plurality of sections, means for advancing said sections in parallel paths, side registering means and front registering means, means for conveying a section in one of said paths transversely therefrom along and in engagement with said front registering means toward a section in another of said paths and into position against said side registering means such that one of the sections overlies the other section and is in accurate alignment therewith, said conveying means comprising untimed opposed elements relatively displaceable by the sheet sections acted upon, and means for simultaneously folding the over and underlying sections at right angles to the folds previously made therein and for inserting one section within the other.

35. In a folding machine, timed knife type means for folding a sheet, means for cutting the folded sheet into a plurality of inner and outer sections, means for advancing said inner and outer sections in parallel paths, side registering means and front registering means, means for conveying the inner sections transversely in opposite directions along and in engagement with said front registering means toward the outer sections and into positions against said side registering means such that the outer sections overlie the inner sections and are in accurate alignment therewith, said conveying means comprising untimed opposed elements relatively displaceable by the sheet sections acted upon, and a plurality of timed knife type means for simultaneously folding the over and underlying outer and inner sections at right angles to the folds previously made therein and for inserting the outer sections within the inner sections.

36. In a folding machine, means for making one or more folds in a sheet transversely thereof, means for cutting the folded sheet into sections, means for advancing said sections in parallel paths, side registering means, guide means extending transversely of said paths, means disposed diagonally of the guide means for conveying a section in one of said paths transversely therefrom along and in engagement with said guide means toward a section in another of said paths and into position against said side registering means such that one of said sections overlies the other section and is in accurate alignment therewith, and means for folding the over and underlying sections simultaneously at right angles to the folds previously made therein and for inserting one section within the other.

37. In a folding machine, timed knife type means for folding a sheet, means for cutting the folded sheet into a plurality of sections, means for advancing said sections in parallel paths, guide means extending transversely of said paths, side registering means, means disposed diagonally of the guide means for conveying sections in some of said paths transversely therefrom along and in engagement with said guide means toward sections in other of said paths and into positions against said side registering means such that certain of the sections overlie other sections and are in accurate alignment therewith, and means for simultaneously folding the over and underlying sections at right angles to the folds previously made therein and for inserting them one within another.

38. In a folding machine, timed knife type means for folding a sheet, means for cutting the folded sheet into a plurality of inner and outer sections, means for advancing said inner and outer sections in parallel paths, guide means extending transversely of said paths, side registering means, means disposed diagonally of the guide means in opposite directions for feeding the inner sections transversely in opposite directions along and in engagement with said guide means toward the outer sections and into positions against said side registering means such that the outer sections overlie the inner sections and are in accurate alignment therewith, and a plurality of knife type means for simultaneously folding the over and underlying outer and inner sections at right angles to the folds previously made therein and for inserting the outer sections within the inner sections.

39. In a folding machine, means for making one or more folds in a sheet transversely thereof, means for cutting the folded sheet into sections, means for advancing said sections in parallel paths, guide means extending transversely of said paths, side registering means, a plurality of pairs of relatively yieldable rollers disposed diagonally of the guide means for conveying a section in one of said paths transversely therefrom along and in engagement with said guide means toward a section in another of said paths and into position against said side registering means such that one of said sections overlies the other section and is in accurate alignment therewith, and means for folding the over and underlying sections simultaneously at right angles to the folds previously made therein and for inserting one section within the other.

40. In a folding machine, timed knife type means for folding a sheet, means for cutting the folded sheet into a plurality of sections, means for advancing said sections in parallel paths, guide means extending transversely of said paths, side registering means, a plurality of pairs of relatively yieldable rollers disposed diagonally of the guide means for conveying sections in some of said paths transversely therefrom along and in engagement with said guide means toward sections in other of said paths and into positions against said side registering means such that certain of the sections overlie other sections and are in accurate alignment therewith, and means for simultaneously folding the over and underlying sections at right angles to the folds previously made therein and for inserting them one within another.

41. In a folding machine, timed knife type means for folding a sheet, means for cutting the folded sheet into a plurality of inner and outer sections, means for advancing said inner and outer sections in parallel paths, guide means extending transversely of said paths, side registering means, a plurality of pairs of relatively yieldable rollers disposed diagonally of the guide means in opposite directions for conveying the inner sections transversely in opposite directions along and in engagement with said guide means toward the outer sections and into positions against said side registering means such that the outer sections overlie the inner sections and are in accurate alignment therewith, and a plurality of knife type means for simultaneously folding the over and underlying outer and inner sections at right angles to the folds previously made therein and for inserting the outer sections within the inner sections.

42. In a folding machine, means for folding a sheet, means for cutting the folded sheet into sections, means for advancing said sections in parallel paths disposed in an upper level and a lower level respectively, guide means in one of said paths and extending therefrom transversely of another of said paths, side registering means, means for feeding a section in one of said paths transversely therefrom along and in engagement with said guide means toward a section in another of said paths and into position against said side registering means such that one section overlies the other section and is in accurate alignment therewith, said last named means comprising feed elements disposed diagonally of said guide means to maintain the section fed by said feed elements in engagement with the guide means during transverse movement of that section along said guide means, and means for folding the over and underlying sections simultaneously and for inserting one of them within the other.

43. In a folding machine, means for folding a sheet, means for cutting the folded sheet into a plurality of sections, means for advancing said sections in parallel paths disposed in an upper level and a lower level respectively, guide means in some of said paths and extending therefrom transversely of other of said paths, side registering means, means for feeding some of the sections in certain of said paths transversely therefrom along and in engagement with said guide means toward sections in other of said paths and into positions against said side registering means such that certain of the sections overlie other sections and are in accurate alignment therewith, said last named means comprising feed elements disposed diagonally of said guide means to maintain the sections fed by said feed elements in engagement with the guide means during transverse movement of those sections along said guide means, and means for simultaneously folding the over and underlying sections and for inserting them one within another.

44. In a folding machine, means for folding a sheet, means for cutting the folded sheet into a plurality of inner and outer sections, means for advancing said inner and outer sections in parallel paths disposed in lower and upper levels respectively, guide means in the lower level paths of the inner sections and extending transversely of the upper level paths of the outer sections, side registering means, means for feeding the inner sections along and in engagement with the guide means in opposite directions toward the outer sections and into positions against said side registering means such that the inner sections underlie the outer sections and are in accurate alignment therewith, said last named means comprising feed elements disposed diagonally of said guide means in opposite directions to maintain the inner sections in engagement with the guide means during transverse movement of said inner sections in opposite directions along said guide means, and means for simultaneously folding the over and underlying outer and inner sections and for inserting the outer sections within the inner sections.

45. In a folding machine, means for folding a sheet, means for cutting the folded sheet into sections, means for advancing said sections in parallel paths disposed in an upper level and a lower level respectively, guide means in one of said paths and extending therefrom transversely of another of said paths, side registering means, means for feeding a section in one of said paths transversely therefrom along and in engagement with said guide means toward a section in another of said paths and into position against said side registering means such that one section overlies the other section and is in accurate alignment therewith, said last named means comprising a plurality of pairs of relatively yieldable rollers disposed diagonally of said guide means to maintain the section fed by said rollers in engagement with the guide means during transverse movement of that section along said guide means, and means for folding the over and underlying sections simultaneously and for inserting one of them within the other.

46. In a folding machine, means for folding a sheet, means for cutting the folded sheet into a plurality of sections, means for advancing said sections in parallel paths disposed in an upper level and a lower level respectively, guide means in some of said paths and extending therefrom transversely of other of said paths, side registering means, means for feeding some of the sections in certain of said paths transversely therefrom along and in engagement with said guide means toward sections in other of said paths and into positions against said side registering means such that certain of the sections overlie other sections and are in accurate alignment therewith, said last named means comprising a plurality of pairs of relatively yieldable rollers disposed diagonally of said guide means to maintain the sections fed therealong in engagement with the guide means, and means for simultaneously folding the over and underlying sections and for inserting them one within another.

47. In a folding machine, means for folding a sheet, means for cutting the folded sheet into a plurality of inner and outer sections, means for advancing said inner and outer sections in parallel paths disposed in lower and upper levels respectively, guide means in the lower level paths of the inner sections and extending transversely of the upper level paths of the outer sections, side registering means, means for feeding the inner sections along and in engagement with the guide means in opposite directions toward the outer sections and into positions against said side registering means such that the inner sections underlie the outer sections and are in accurate alignment therewith, said last named means comprising a plurality of pairs of relatively yieldable rollers disposed diagonally of said guide means in opposite directions to maintain the inner sections fed along the guide means in engagement therewith, and means for simultaneously folding the over and underlying outer and inner sections and for inserting the outer sections within the inner sections.

48. In a folding machine, means for folding a sheet, means for cutting the folded sheet into sections, means for advancing said sections in parallel paths, guide means in one of said paths and extending therefrom transversely of another of said paths, a side gage adjacent the last named path, means for feeding one of the sections transversely along and in engagement with said guide means and against said side gage into position such that said section is in accurate alignment relative to and may be simultaneously folded with another section, said last named means comprising feed elements disposed diagonally of said guide means to maintain the section fed transversely by said elements in engagement with the guide means during transverse movement of that section therealong to said side gage whereby said transversely fed section is in proper folding position upon engagement of the same with the side gage.

49. In a folding machine, means for folding a sheet, means for cutting the folded sheet into a plurality of sections, means for feeding said sections forwardly in parallel paths disposed at different levels, guide means in some of said paths and extending transversely of other of said paths, side gages adjacent said last named paths, means for feeding some of the sections transversely along and in engagement with said guide means and against said side gages into positions such that said sections are in accurate alignment relative to and may be simultaneously folded with other sections, said last named means comprising feed elements disposed diagonally of said guide means to maintain the sections fed transversely by said elements in engagement with the guide means during movement of those sections therealong whereby said transversely fed sections are in proper folding positions upon engagement of the same with the side gages.

50. In a folding machine, means for folding a sheet, means for cutting the folded sheet into a plurality of outer and inner sections, means for feeding said outer and inner sections forwardly in parallel paths on upper and lower levels respectively, guide means in the lower level paths and extending therefrom transversely of the upper level paths, side gages positioned adjacent opposite ends of the guide means, and means for feeding the inner sections in opposite directions along and in engagement with the guide means, under the outer sections, and against said side gages into positions such that said inner sections are in accurate alignment relative to and may be simultaneously folded with said outer sections, said last named feeding means comprising feed elements disposed diagonally of the guide means in opposite directions to maintain the inner sections fed by said elements in engagement with the guide means during movement of said inner sections therealong whereby the inner sections are in proper folding positions upon engagement of the same with said side gages.

51. In a folding machine, means for folding a sheet, means for cutting the folded sheet into sections, means for advancing said sections in parallel paths, a side gage adjacent one of said paths, means for feeding the section in one path transversely therefrom toward a section in another path and into position against said side gage such that one of said sections overlies the other section, means for folding the over and underlying sections simultaneously and for inserting one of them within the other, and means for discontinuing the feeding action of said feeding means on the section fed thereby when said section is moved to said position against the side gage and prior to the action of said last named folding means thereon.

52. In a folding machine, means for folding a sheet, means for cutting the folded sheet into sections, means for advancing said sections in parallel paths, a side gage adjacent one of said paths, means for feeding the section in one path transversely therefrom toward a section in another path and into position against said side gage such that one of said sections overlies the other section, a folding mechanism for folding the over and underlying sections simultaneously and for inserting one of them within the other, and means controlled by said folding mechanism for discontinuing the feeding action of said feeding means on the section fed thereby when said section is moved to said position against the side gage and prior to the action of said folding mechanism thereon.

53. In a folding machine, means for folding a sheet, means for cutting the folded sheet into inner and outer sections, means for advancing the inner and outer sections in parallel paths, guide means extending transversely of said paths, spaced side gages adjacent certain of said paths, a plurality of pairs of rollers disposed diagonally of the guide means in opposite directions for feeding the inner sections transversely in opposite directions along the guide means toward and under the outer sections and into engagement with said side gages, means for folding the over and underlying outer and inner sections simultaneously and for inserting the outer sections within the inner sections, and means for discontinuing the feeding action of the rollers on the transversely fed inner sections when they strike the side gages and before the last named folding means operates to simultaneously fold and insert the sections as aforesaid.

54. In a folding machine, the combination with folding mechanism and a side gage, of opposed feed means for feeding a sheet transversely of the folding mechanism into position against the side gage for folding of the sheet thereby, by said folding mechanism, and means for discontinuing the feeding action of the opposed feed means on the sheet when the latter is fed by said means into said position against said side gage.

55. In a folding machine, the combination with knife type folding mechanism, of a guide extending transversely thereof, a side gage means for feeding a sheet along the guide into position against the side gage for folding of the sheet by said folding mechanism, said feeding means comprising a lower driven roller and a pivoted upper driven roller cooperating with said lower roller, and means operated by said folding mechanism for lifting the upper driven roller out of engagement with the sheet when it has been fed by said rollers into said position against said side gage and before the sheet is folded by said folding mechanism.

56. In a folding machine, the combination with folding mechanism, of a guide extending transversely thereof, a side gage adjacent one end of the guide, opposed relatively displaceable rollers disposed diagonally of said guide for feeding a sheet along the same into engagement with the side gage, and means for discontinuing the feeding action of the rollers on the sheet when the latter is fed against said side gage and before the action of the folding mechanism on said sheet.

57. In a folding machine, the combination with folding mechanism, of a grooved guide extending transversely thereof, a side gage adjacent one end of the guide, opposed relatively displaceable upper and lower rollers disposed diagonally of said guide adjacent the groove thereof for feeding a sheet along the same and into engagement with the side gage, and means for discontinuing the feeding action of the rollers on the sheet when the latter is fed against said side gage and before the action of the folding mechanism on said sheet.

58. In a folding machine, the combination with folding mechanism and a side gage, of opposed relatively displaceable feed rollers for feeding a sheet transversely of the folding mechanism into position against the side gage for folding of the sheet by said folding mechanism, and means for displacing one of said rollers relative to the other and discontinuing the feeding action of the rollers on the sheet when the latter is fed by said rollers into said position against said side gage.

59. In a folding machine, the combination with knife type folding mechanism and a side gage, of opposed relatively displaceable feed rollers for feeding a sheet transversely of the folding mechanism into position against the side gage for folding of the sheet by the folding mechanism, and means actuated by the knife of said folding mechanism for displacing one of said rollers relative to the other and discontinuing the feeding action of the rollers on the sheet when the latter is fed by said rollers into said position against said side gage.

60. In a folding machine, knife type means for making a fold in a sheet transversely thereof, means for advancing the folded sheet, a second knife type means disposed laterally of the sheet advancing means for making a fold in the sheet at right angles to the fold previously made therein, front registering means extending from said sheet advancing means to the second knife type folding means, side registering means adjacent the second knife type folding means, and untimed means for feeding the sheet laterally from said advancing means, along and in engagement with said front registering means, and toward the second knife type folding means into position against said side registering means for folding of said sheet by said second knife type folding means.

61. In a folding machine of the type having a pair of folding rollers and blade means cooperating therewith to fold the paper, the combination of slides carrying the blade means and adapted for reciprocation to actuate said blade means, and eccentrically mounted means for adjusting said slides to align the blade means with the bite between said rollers.

62. In a folding machine of the type having a pair of folding rollers and blade means cooperating therewith to fold the paper, the combination of slides carrying the blade means and adapted for reciprocation to actuate said blade means, bearings for the slides, and eccentrics rotatably mounting the bearings and adapted for rotation to adjust said bearings and said slides and align the blade means with the bite between said rollers.

63. In a folding machine of the type having a pair of folding rollers and blade means cooperating therewith to fold the paper, the combination of slides carrying the blade means and adapted for reciprocation to actuate said blade means, guides for the slides, antifriction bearings for guiding the slides in said guides, and eccentrics on the guides carrying the bearings and adapted for rotation to adjust said bearings and said slides and align the blade means with the bite betwen said rollers.

64. In a folding machine, the combination with folding means for making one or more folds in a sheet transversely thereof and conveying means disposed below and extending forwardly of the folding means, of mechanism normally disposed between the folding and conveying means for receiving the folded sheet from the folding means and for cutting said sheet into folded sections and delivering them to the conveying means, and means pivotally mounting said mechanism whereby the same may be swung into operative position between the folding and conveying means or into inoperative position rearwardly thereof.

65. In a folding machine, the combination with folding means for making one or more folds in a sheet transversely thereof and conveying means disposed below and extending forwardly of the folding means, of mechanism normally disposed between the folding and conveying means for receiving the folded sheet from the folding means and for cutting said sheet into folded sections and delivering them to the conveying means, a pivotally mounted frame carrying the receiving, cutting and delivering mechanism, gear mechanism for rocking the frame and said receiving, cutting and delivering mechanism forwardly and rearwardly whereby the latter may be swung into operative position between the folding and conveying means or into inoperative position rearwardly thereof, and means for locking said gear mechanism to prevent accidental rearward swinging movement of the frame and hold the receiving, cutting and delivering mechanism in operative position.

66. In a folding machine, the combination with folding means for making one or more folds in a sheet transversely thereof and conveying means disposed below and extending forwardly of the folding means, of mechanism normally disposed between the folding and conveying means for receiving the folded sheet from the folding means and for cutting said sheet into folded sections and delivering them to the conveying means, a rotatably mounted shaft, a frame fixed on the shaft and carrying the receiving, cutting and delivering mechanism, gear means for rocking the shaft to swing the frame forwardly and rearwardly and move said mechanism into operative position between said folding and conveying means or into inoperative position rearwardly thereof, stop means engaged by the frame when it is swung forwardly and acting to produce torque on the shaft through continued turning effort imparted thereto by said gear means after engagement of said stop means by said frame, and means for locking the gear means upon production of torque on the shaft as aforesaid to thereby prevent accidental rearward swinging movement of the frame and hold said receiving, cutting and delivering mechanism in operative position with the aid of said torque.

LESLEY R. TUFTS.
WALTER HOLMS.

CERTIFICATE OF CORRECTION.

Patent No. 2,232,152. February 18, 1941.

LESLEY R. TUFTS, ET AL.

It is hereby certified that error appears in the printed specification of the above numbered patent requiring correction as follows: Page 24, second column, line 11, claim 54, strike out the word and comma "thereby,"; line 18, claim 55, after "gage" insert a comma; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.